United States Patent
Petry et al.

(10) Patent No.: US 10,554,621 B2
(45) Date of Patent: *Feb. 4, 2020

(54) SECURE ANALYSIS APPLICATION FOR ACCESSING WEB RESOURCES

(71) Applicant: Authentic8, Inc., Mountain View, CA (US)

(72) Inventors: Scott M. Petry, Portola Valley, CA (US); Ramesh Rajagopal, Los Altos, CA (US); Peter K. Lund, San Francisco, CA (US); Fredric L. Cox, San Jose, CA (US); Adam P. Moore, San Francisco, CA (US); Leslie L. Dunston, Foster City, CA (US); Varley H. Taylor, San Francisco, CA (US); Zachary L. Segal, San Francisco, CA (US); Luka I. Stolyarov, San Francisco, CA (US); Joshua R. McMains, Morgan Hill, CA (US); Brian T. Zaugg, Campbell, CA (US)

(73) Assignee: Authentic8, Inc., Redwood City, CA (US)

(*) Notice: Subject to any disclaimer, the term of this patent is extended or adjusted under 35 U.S.C. 154(b) by 11 days.

This patent is subject to a terminal disclaimer.

(21) Appl. No.: 16/036,822

(22) Filed: Jul. 16, 2018

(65) Prior Publication Data

US 2018/0324145 A1 Nov. 8, 2018

Related U.S. Application Data

(63) Continuation of application No. 15/728,315, filed on Oct. 9, 2017, now Pat. No. 10,027,625, which is a
(Continued)

(51) Int. Cl.
*H04L 29/06* (2006.01)
*H04L 29/08* (2006.01)

(52) U.S. Cl.
CPC ........ *H04L 63/0209* (2013.01); *H04L 63/083* (2013.01); *H04L 63/0876* (2013.01);
(Continued)

(58) Field of Classification Search
CPC ............. H04L 63/0209; H04L 67/2814; H04L 63/083; H04L 67/1097; H04L 63/0876; H04L 67/02; H04L 63/10; H04L 63/123
See application file for complete search history.

(56) References Cited

U.S. PATENT DOCUMENTS 6,138,168 A 10/2000 Kelly et al.
6,347,306 B1 2/2002 Swart
(Continued)

FOREIGN PATENT DOCUMENTS

| EP | 1233333 A1 | 8/2002 |
|---|---|---|
| WO | 2008-156924 A1 | 12/2008 |
| WO | 2018165602 A1 | 9/2018 |

OTHER PUBLICATIONS

Extended European Search Report dated Feb. 20, 2019 in connection with European Application No. 18212536.9, 10 pages.
(Continued)

*Primary Examiner* — Chau Le
(74) *Attorney, Agent, or Firm* — Baker & McKenzie LLP

(57) ABSTRACT

Embodiments described herein may be directed to systems, methods, apparatuses, devices, computer program products, computer-executable instructions, and/or applications for securely and anonymously accessing web resources and customizable attribution of identity. In accordance with the present disclosure, a user may inspect and analyze a webpage as well as the underlying source code from an "arm's length" using a secure analysis application to prevent exposure on the user's local machine. The secure analysis application may provide increased flexibility in masking and/or
(Continued)

modifying the user's digital persona to external websites. Additionally, the secure analysis application may be integrated with a translation service to translate textual web content without the web content provider being alerted that a translation is taking place.

21 Claims, 5 Drawing Sheets

Related U.S. Application Data continuation of application No. 15/395,914, filed on Dec. 30, 2016, now Pat. No. 9,787,637, which is a continuation of application No. 15/049,075, filed on Feb. 20, 2016, now Pat. No. 9,537,873.

(60) Provisional application No. 62/118,862, filed on Feb. 20, 2015.

(52) U.S. Cl.
 CPC ............ *H04L 63/10* (2013.01); *H04L 63/123* (2013.01); *H04L 67/02* (2013.01); *H04L 67/1097* (2013.01); *H04L 67/2814* (2013.01)

(56) References Cited

U.S. PATENT DOCUMENTS

| | | | |
|---|---|---|---|
| 6,704,024 B2 | 3/2004 | Robotham et al. | |
| 6,963,916 B1 | 11/2005 | Pugaczewski et al. | |
| 7,120,142 B1 | 10/2006 | Oz et al. | |
| 7,334,254 B1 | 2/2008 | Boydstun et al. | |
| 7,363,363 B2 | 4/2008 | Dal Canto et al. | |
| 7,774,363 B2 | 8/2010 | Lim | |
| 7,779,034 B2 | 8/2010 | Pedersen et al. | |
| 7,934,253 B2 | 4/2011 | Overcash et al. | |
| 7,958,012 B2 | 6/2011 | Hudak et al. | |
| 8,266,685 B2 | 9/2012 | Abzarian et al. | |
| 8,306,807 B2 | 11/2012 | Van Guilder et al. | |
| 8,332,626 B2 | 12/2012 | Mansfield | |
| 8,375,434 B2 | 2/2013 | Cottrell et al. | |
| 8,443,416 B2 | 5/2013 | Sabin et al. | |
| 8,484,718 B2 | 7/2013 | Chacko et al. | |
| 8,555,273 B1 | 10/2013 | Chia et al. | |
| 8,589,338 B2 | 11/2013 | Maes | |
| 8,615,795 B2 | 12/2013 | Cottrell et al. | |
| 8,763,082 B2 | 6/2014 | Huber et al. | |
| 8,776,169 B2 | 7/2014 | Rajagopal et al. | |
| 8,844,043 B2 | 9/2014 | Williams et al. | |
| 8,868,724 B2 | 10/2014 | Goodwin et al. | |
| 8,881,227 B2 | 11/2014 | Rajagopal et al. | |
| 8,984,621 B2 | 3/2015 | Burch et al. | |
| 9,075,895 B2 | 7/2015 | Lindsey et al. | |
| 9,246,904 B2 | 1/2016 | Rajagopal et al. | |
| 9,306,972 B2 | 4/2016 | Amiga | |
| 9,313,227 B2 | 4/2016 | Amiga | |
| 9,379,895 B2 | 6/2016 | Kailash et al. | |
| 9,391,832 B1 | 7/2016 | Song et al. | |
| 9,521,118 B2 | 12/2016 | Cottrell et al. | |
| 9,537,873 B2 | 1/2017 | Petry et al. | |
| 9,712,386 B1 | 7/2017 | Chen et al. | |
| 9,787,637 B2 | 10/2017 | Petry et al. | |
| 10,027,625 B2 | 7/2018 | Petry et al. | |
| 10,027,714 B2 | 7/2018 | Rajagopal et al. | |
| 2003/0050932 A1 | 3/2003 | Pace et al. | |
| 2003/0120593 A1 | 6/2003 | Bansal et al. | |
| 2003/0135543 A1 | 7/2003 | Kittredge et al. | |
| 2003/0187689 A1 | 10/2003 | Barnes et al. | |
| 2004/0049702 A1* | 3/2004 | Subramaniam | G06Q 20/382 726/28 |
| 2004/0107360 A1 | 6/2004 | Hermann et al. | |
| 2004/0205101 A1 | 10/2004 | Radhakrishnan | |
| 2004/0239681 A1 | 12/2004 | Robotham et al. | |
| 2005/0097353 A1 | 5/2005 | Patrick et al. | |
| 2006/0005008 A1 | 1/2006 | Kao | |
| 2006/0041755 A1 | 2/2006 | Pemmaraju | |
| 2007/0016949 A1 | 1/2007 | Dunagan et al. | |
| 2007/0101435 A1 | 5/2007 | Konanka et al. | |
| 2007/0115990 A1* | 5/2007 | Asati | H04L 45/00 370/392 |
| 2007/0214359 A1* | 9/2007 | Williamson | H04L 63/0272 713/163 |
| 2008/0016551 A1 | 1/2008 | Pinkas et al. | |
| 2008/0271020 A1 | 10/2008 | Leitz et al. | |
| 2009/0187919 A1 | 7/2009 | Maes | |
| 2010/0024036 A1 | 1/2010 | Morozov et al. | |
| 2010/0057836 A1 | 3/2010 | Anbuselvan | |
| 2010/0125902 A1 | 5/2010 | Killian et al. | |
| 2011/0184993 A1 | 7/2011 | Chawla et al. | |
| 2011/0247045 A1 | 10/2011 | Rajagopal et al. | |
| 2013/0014259 A1 | 1/2013 | Gribble et al. | |
| 2013/0290404 A1 | 10/2013 | Rajabi et al. | |
| 2013/0335436 A1 | 12/2013 | Lindsey | |
| 2013/0340028 A1* | 12/2013 | Rajagopal | H04L 63/08 726/1 |
| 2015/0106683 A1 | 4/2015 | Lindsey et al. | |
| 2015/0222600 A1 | 8/2015 | Cottrell et al. | |
| 2016/0352803 A1 | 12/2016 | Amiga et al. | |
| 2017/0034190 A1 | 2/2017 | May | |
| 2017/0111318 A1 | 4/2017 | Petry et al. | |
| 2017/0180413 A1* | 6/2017 | Petry | H04L 63/0209 |
| 2017/0208079 A1* | 7/2017 | Cammarota | H04L 63/10 |
| 2017/0223029 A1 | 8/2017 | Sharma et al. | |
| 2018/0034773 A1 | 2/2018 | Petry et al. | |

OTHER PUBLICATIONS

Anonymous, "Proxy serer—Wikipedia", retrieved from Internet: URL:https:\\en.wikipedia.org/w/index.php?title=Proxy_server&oldid=865232195, [retrieved on Feb. 8, 2019], Oct. 22, 2018, XP55554267, 14 pages.

Anonymous, "Tor (anonymity network)—Wikipedia", retrieved from Internet URL:https://en.wikipedia.org/w/index.pho?title=Tor_(anonymity network)&oldid=866478846, [retrieved on Feb. 8, 2019], Oct. 30, 2018, 36 pages.

Tiwari, Auy, et al., "A multifactor security protocol for wireless payment-secure-web authentication using mobile devices", Retrieved from https://arxiv.org/ftp/arxiv/papers/1111/1111.3010.pdf, arXiv preprint arXiv:1111.3010 (2011), 8 pages.

Tom Scholl, "Internet Routing and Traffic Engineering", AWS Architecture Blog, Retrieved from https://aws.amazon.com/blogs/architecture/internet-routing-and-traffic-engineering/, Published Dec. 15, 2014 (Year:2014), 14 pages.

International Search Report and the Written Opinion of the International Searching Authority in connection with PCT Application No. PCT/US2016/018828, dated Jun. 8, 2016, 10 pages.

Koved, Larry, et al.., "Security challenges for Enterprise Java in an e-business environment", Retrieved from http://ieeexplore.ieee.org/stamp.jsp?arnumber=5386964, IBM Systems Journal 40.1 (2001): 130-152, Published 2001, 23 pages.

Guitart, Jordi et al., "Characterizing secure dynamic web applications scalability", Retrieved from http://ieeexplore.ieee.org/stamp/stamp.jsp?arnumber=1419933, 19th IEEE International Parallel and Distributed Processing Symposium, IEEE, Published 2005, 10 pages.

International Search Report and Written Opinion dated Aug. 23, 2011 in connection with International Application No. PCT/US2011/030620, 7 pages.

Tzi-cker Chiueh, et al., "Spout: a transparent proxy for safe execution of Java applets", in Selected Areas in Communications, IEEE Journal, vol. 20, No. 7, pp. 1426-1433, Sep. 2002, Web Accessed; Sep. 18, 2015, doi: 10.1109/JSAC, 2002.802074, URL: http://ieeexplore.ieee.org/stamp/stamp.jsp?tp-&arnumber1031912&isnumber=22158, 8 pages.

Berryman, A., et al., "VDBench: A Benchmarking Toolkit for Thin-Client Based Virtual Desktop Environments", (CloudCom), 2010 IEEE Second Intl Conf., pp. 480-487, Nov. 30-Dec. 3, 2010,

(56) References Cited

OTHER PUBLICATIONS

Accessed; Sep. 18, 2015, doi: 10.1109/CloudCom.2010.106, URL: http://ieeexplore.ieee.org/stamp/stamp.jsp?tp+&arnumber=5708490 &isnumber=5708426, 8 pages.
Lesueur, F., et al., "SAFE-OS: A secure and usable desktop operating system", 2010 Fifth Intl Conf., pp. 1-7, Oct. 10-13, 2010, Web Accessed; Sep. 18, 2015, doi: 10.1109/CRISIS.2010.5764916, URL: http://ieeexplore.ieee.org/stamp/jsp?tp=&arnumber=5764916 &isnumber=5764913, 7 pages.
"Tab (GUI: Difference between revisions)", Wikipedia, Wikimedia Foundation, published Apr. 19, 2009, Accessed Web, Apr. 18, 2014, <http://en.wikipedia.org/w/index.php?title=Tab_(GUI)&diff=284321974 &oldid=283>, 1 page.
"Internet Explorer—7—Wikipedia, the free encyclopedia", Wikipedia, the free encyclopedia, published Apr. 9, 2009, Accessed—Web. Oct. 10, 2013, <http://en.wikipedia.org/w/index.php?title=Internet_Explorer_7&oldid=282788819>, 8 pages.
Petry et al., U.S. Appl. No. 15/454,915, 383 pages.
Petry et al., U.S. Appl. No. 16/036,846, 145 pages.
Petry et al., U.S. Appl. No. 16/181,324, 153 pages.
Rajagopal et al., U.S. Appl. No. 16/036,813, 111 pages.

\* cited by examiner

SECURE ANALYSIS APPLICATION FOR ACCESSING WEB RESOURCES

CROSS-REFERENCE TO RELATED APPLICATIONS

This application is a continuation application of, and claims priority to, U.S. patent application Ser. No. 15/728,315 filed on Oct. 7, 2017, which is a continuation application of and claims priority to U.S. patent application Ser. No. 15/395,914 filed on Dec. 30, 2016, which is a continuation application of and claims priority to U.S. patent Ser. No. 15/049,075 filed on Feb. 20, 2016, which is a nonprovisional application of and claims priority to U.S. Provisional Patent Application No. 62/118,862 filed on Feb. 20, 2015, the disclosures of all of which are hereby incorporated by reference in their entirety.

TECHNICAL FIELD

Embodiments disclosed herein relate to a secure analysis application for accessing web resources.

BACKGROUND

When a user navigates an unsecure network such as the World Wide Web (e.g., the Internet), the user may be exposed to a variety of data security risks. Accordingly, a need exists for increased web browsing security.

SUMMARY

In some embodiments, a computing apparatus is provided. The computing apparatus defines a first location in a network and comprises: at least one memory comprising instructions; and at least one processing device configured for executing the instructions, wherein the instructions cause the at least one processing device to perform the operations of: establishing, using a secure analysis application comprised in the at least one memory, a web browsing session with the network; selecting, using a traffic routing unit comprised in the at least one processing device, a secure web container through which web content is to be accessed during the web browsing session, wherein the secure web container defines a second location in the network different than the first location; selecting, using the traffic routing unit, an egress node through which the web content is to be routed during the web browsing session, wherein the egress node defines a third location in the network different than the first location and the second location; and displaying, using a graphical processing unit (GPU) comprised in the at least one processing device, the web content to a user of the computing apparatus.

In some embodiments, the instructions further cause the at least one processing device to perform the operations of: generating, using a content management unit of the at least one processing device, a request to receive, at the secure web container, the web content from a web server; and transmitting, using the traffic routing unit, the request to the secure web container, wherein the request is transmitted to the web server from the secure web container via the network by routing the request through the egress node, and wherein the web server is unable to determine at least one of the first location and the second location.

In some embodiments, the web content is received at the secure web container from the web server via the network in response to transmitting the request to the web server, and wherein the web server defines a fourth location in the network different than the first location, the second location, and the third location.

In some embodiments, the instructions further cause the at least one processing device to perform the operations of: identifying, using a translation unit associated with the secure web container text comprised in the web content, wherein the text defines a first language; extracting, using the translation unit, the text from the web context; transmitting, using the translation unit, the text to a translation service for translation, wherein the translation service is unable to determine the fourth location; and receiving, using the translation unit and at the secure web container, translated text defining a second language different than the first language, wherein displaying the web content to the user of the computing apparatus comprises accessing the translated text using the translation unit.

In some embodiments, the instructions further cause the at least one processing device to perform the operations of: storing, using a storage mapping unit associated with the secure web container, at least one of the web content, the text, and the translated text in a cloud-based storage platform.

In some embodiments, selecting the secure web container comprises selecting two or more secure web containers through which the web content is to be accessed, and wherein each of the two or more secure web containers defines a different location in the network.

In some embodiments, selecting the egress node comprises selecting two or more egress nodes through which the web content is to be routed, and wherein each of the two or more egress nodes defines a different location in the network.

In some embodiments, a non-transitory computer readable medium is provided. The non-transitory computer readable medium defines a first location in a network and comprises code is provided, wherein the code, when executed by at least one processing device of a computing apparatus, causes the at least one processing device to perform the operations of: establishing, using a secure analysis application comprised in the at least one memory, a web browsing session with the network; selecting, using a traffic routing unit comprised in the at least one processing device, a secure web container through which web content is to be accessed during the web browsing session, wherein the secure web container defines a second location in the network different than the first location; selecting, using the traffic routing unit, an egress node through which the web content is to be routed during the web browsing session, wherein the egress node defines a third location in the network different than the first location and the second location; and displaying, using a graphical processing unit (GPU) comprised in the at least one processing device, the web content to a user of the computing apparatus.

In some embodiments, the non-transitory computer readable medium further comprises code that, when executed by the at least one processing device of the video content server, causes the at least one processing device to perform the operations of: generating, using a content management unit of the at least one processing device, a request to receive, at the secure web container, the web content from a web server; and transmitting, using the traffic routing unit, the request to the secure web container, wherein the request is transmitted to the web server from the secure web container via the network by routing the request through the egress node, and wherein the web server is unable to determine at least one of the first location and the second location.

In some embodiments, the web content is received at the secure web container from the web server via the network in response to transmitting the request to the web server, and wherein the web server defines a fourth location in the network different than the first location, the second location, and the third location.

In some embodiments, the non-transitory computer readable medium further comprises code that, when executed by the at least one processing device of the video content server, causes the at least one processing device to perform the operations of: identifying, using a translation unit associated with the secure web container, text comprised in the web content, wherein the text defines a first language; extracting, using the translation unit, the text from the web context; transmitting, using the translation unit, the text to a translation service for translation, wherein the translation service is unable to determine the fourth location; and receiving, using the translation unit and at the secure web container, translated text defining a second language different than the first language, wherein displaying the web content to the user of the computing apparatus comprises accessing the translated text using the translation unit.

In some embodiments, the non-transitory computer readable medium further comprises code that, when executed by the at least one processing device of the video content server, causes the at least one processing device to perform the operations of: storing, using a storage mapping unit associated with the secure web container, at least one of the web content, the text, and the translated text in a cloud-based storage platform.

In some embodiments, selecting the secure web container comprises selecting two or more secure web containers through which the web content is to be accessed, and wherein each of the two or more secure web containers defines a different location in the network.

In some embodiments, selecting the egress node comprises selecting two or more egress nodes through which the web content is to be routed, and wherein each of the two or more egress anodes defines a different location in the network.

In some embodiments, a method is provided. The method comprises: establishing, using a secure analysis application comprised in at least one memory of a computing apparatus defining a first location in a network, a web browsing session with the network; selecting, using a traffic routing unit comprised in at least one processing device of the computing apparatus, a secure web container through which web content is to be accessed during the web browsing session, wherein the secure web container defines a second location in the network different than the first location; selecting, using the traffic routing unit, an egress node through which the web content is to be routed during the web browsing session, wherein the egress node defines a third location in the network different than the first location and the second location; and displaying, using a graphical processing unit (GPU) comprised in the at least one processing device, the web content to a user of the computing apparatus.

In some embodiments, the method further comprises: generating, using a content management unit of the at least one processing device, a request to receive, at the secure web container, the web content from a web server; transmitting, using the traffic routing unit, the request to the secure web container; transmitting, from the secure web container and using a second traffic routing unit associated with the secure web container, the request to the web server via the network by routing the request through the egress node, wherein the web server is unable to determine at least one of the first location and the second location.

In some embodiments, the method further comprises: receiving, using the second traffic routing unit, the web content at the secure web container from the web server via the network in response to transmitting the request to the web server, wherein the web server defines a fourth location in the network different than the first location, the second location, and the third location.

In some embodiments, the method further comprises: identifying, using a translation unit associated with the secure web container, text comprised in the web content, wherein the text defines a first language; extracting, using the translation unit, the text from the web context; transmitting, using the translation unit, the text to a translation service for translation, wherein the translation service is unable to determine the fourth location; and receiving, using the translation unit and at the secure web container, translated text defining a second language different than the first language, wherein displaying the web content to the user of the computing apparatus comprises accessing the translated text using the translation unit.

In some embodiments, selecting the secure web container comprises selecting two or more secure web containers through which the web content is to be accessed, and wherein each of the two or more secure web containers defines a different location in the network.

In some embodiments, selecting the egress node comprises selecting two or more egress nodes through which the web content is to be routed, and wherein each of the two or more egress nodes defines a different location in the network.

In some embodiments, a secure web container may be provided. Internet content may be accessed through the secure web container during an Internet session, the secure web container located in a first location, and the secure web container comprising: at least one memory comprising instructions; and at least one processing device configured for executing the instructions, wherein the instructions cause the at least one processing device to perform operations of: receiving a request for the Internet content from a user device located in a second location different from the first location, wherein the user device executes an Internet application associated with the Internet session, wherein the Internet content is associated with the Internet application and is derived from an Internet content source; communicating with the Internet content source to access the Internet content, such that the user device is substantially insulated from communicating directly with the Internet content source; and transmitting second Internet content to the user device, wherein the user device initiates display of, using a graphical processing unit (GPU) comprised in the at least one user device, the second Internet content to a user of the user device, wherein the Internet content or the second Internet content is routed through an egress node selected from one or more egress nodes.

In some embodiments, the user device is a mobile device.

In some embodiments, the second Internet content is a modified version of the Internet content.

In some embodiments, the egress node is located at a third location the same as, different from, or similar to the first location or the second location.

In some embodiments, the secure web container is isolated from a second secure web container.

In some embodiments, the secure web container is allocated computing resources based on a volume of Internet content requests received from the user device.

In some embodiments, the secure web container performs at least one of rendering or executing the Internet content remotely from the user device.

In some embodiments, a third-party service, located at a third location different from at least one of the first location or the second location, analyzes a file.

In some embodiments, a second user device executing a second Internet application accesses at least one of the same Internet content or the same second Internet content as the user device executing the Internet application.

In some embodiments, an anonymous user identity is presented to the Internet content source.

In some embodiments, a method is provided. The method may comprise: receiving, using a secure web container located at a first location, a request for Internet content from a user device located in a second location different from the first location, wherein the user device executes an Internet application associated with an Internet session, and wherein the Internet content is associated with the Internet application and is derived from an Internet content source; communicating, using the secure web container, with the Internet content source to access the Internet content, such that the user device is substantially insulated from communicating directly with the Internet content source; and transmitting, using the secure web container, second Internet content to the user device, wherein the user device initiates display of, using a graphical processing unit (GPU) comprised in the at least one user device, the second Internet content to a user of the user device, wherein the Internet content or the second Internet content is routed through an egress node selected from one or more egress nodes, and wherein the secure web container comprises a computing apparatus through which the Internet content is to be accessed by the user device during the Internet session.

In some embodiments, the display of the second Internet content occurs within a browser application executed on the user device.

In some embodiments, the communication between the secure web container and the user device is encrypted.

In some embodiments, data associated with the Internet session is stored in one or more physical locations based on a policy.

In some embodiments, data associated with the Internet session is stored on a cloud-based storage platform, and the user can configure access to the data stored on the cloud-based storage platform.

In some embodiments, data stored in a cloud-based storage platform is deleted after an established period of time based on data retention rules.

In some embodiments, the secure web container is selected from a plurality of secure web containers.

In some embodiments, the selection of a secure web container from a plurality of secure web containers is based on identification information associated with the user device.

In some embodiments, the selection of a secure web container from a plurality of secure web containers is based on a physical location of the user device.

In some embodiments, the selection of the egress node from the one or more egress nodes is based on identification information associated with the user device.

In some embodiments, the selection of the egress node from the one or more egress nodes is based on a physical location of the user device.

BRIEF DESCRIPTION OF THE DRAWINGS

Reference is now made to the following detailed description, taken in conjunction with the accompanying drawings.

It is emphasized that various features may not be drawn to scale and the dimensions of various features may be arbitrarily increased or reduced for clarity of discussion. Further, some components may be omitted in certain figures for clarity of discussion.

DETAILED DESCRIPTION

Introduction

Embodiments described herein may be directed to systems, methods, apparatuses, devices, computer program products, computer-executable instructions, and/or applications for securely and anonymously accessing web resources and customizable attribution of identity. In accordance with the present disclosure, a user may inspect and analyze a webpage as well as the underlying source code from an "arm's length" using a secure analysis application to prevent exposure on the user's local machine. The secure analysis application may provide increased flexibility in masking and/or modifying the user's digital persona to external websites.

Further in accordance with the present disclosure, the secure analysis application may be integrated with a translation service to translate textual web content without the web content provider being alerted that a translation is taking place. The secure analysis application may additionally or alternatively be integrated with a temporal and/or persistent cloud-based storage platform that allows data to be stored between sessions and selectively shared among users in an organization.

System Operation

Figure 1:
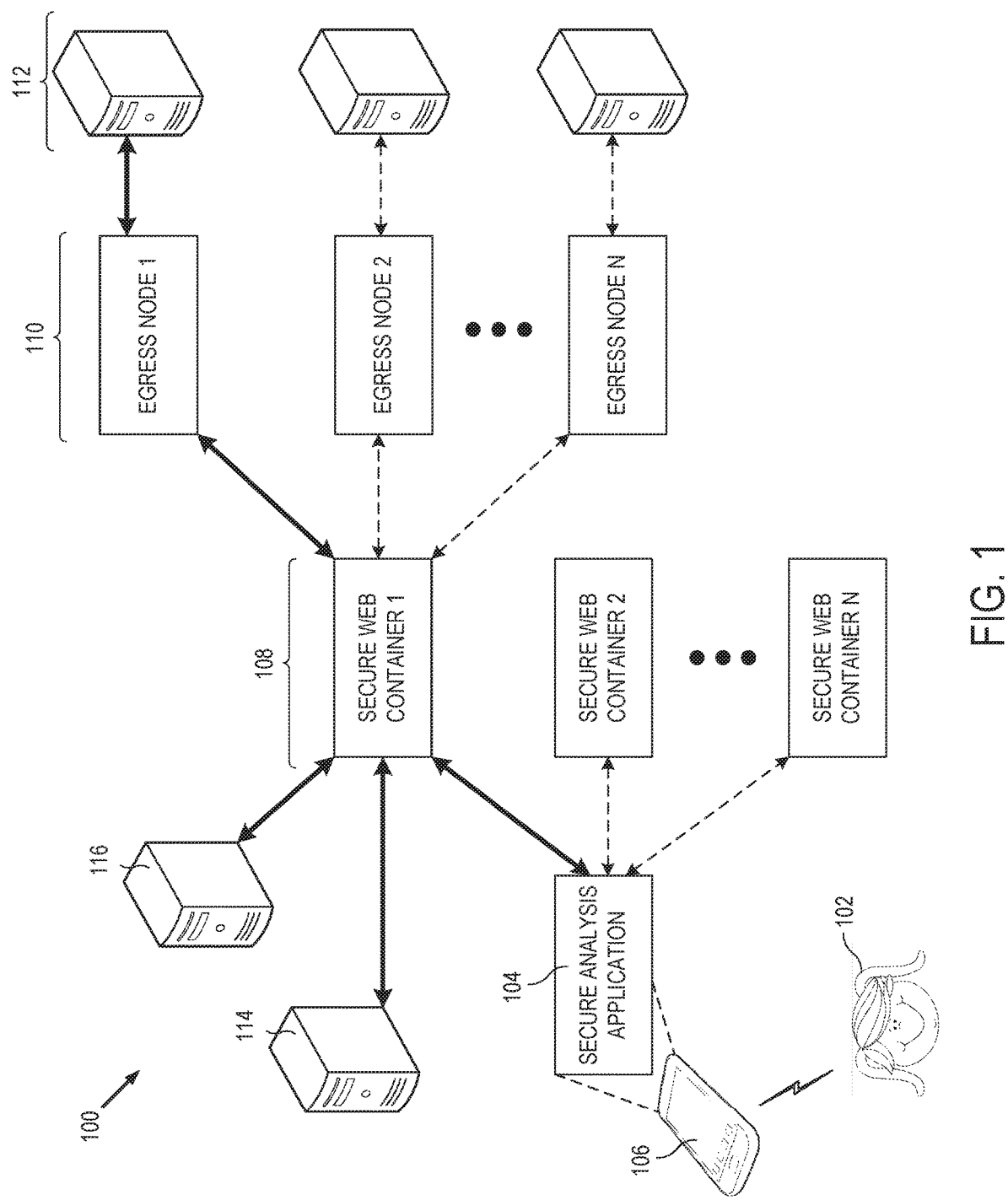
FIG. 1 shows an exemplary system for providing a secure web browsing experience, in accordance with some embodiments of the disclosure.

Referring now to the Figures, FIG. 1 shows an exemplary system 100 for providing a user 102 with a secure and anonymous web browsing experience as described herein. Using a secure analysis application 104 (e.g., a web browser application) running on a user device 106, the user 102 may initiate a web browsing session to access web content via a network (e.g., the Internet) using one or more secure web containers 108. In some embodiments, initiating a web browsing session includes establishing a communication connection between the user device 106 and one or more other devices based at least in part on one or more wireless and/or wired communication protocols as described herein.

During the secure web browsing session and via the secure analysis application 104, the user 102 may select one or more secure web containers 108 (e.g., separate web browsers each having a different location (e.g., Internet Protocol (IP) address) and/or identity (e.g., device identification number) than the secure analysis application 104 and/or the user device 106 in the network) through which the web content may be accessed by the user 102. In this way, the one or more secure web containers 108 may serve as separate and secure proxy web browsers for providing the user 202 with the web content while insulating the secure analysis application 104 and/or the user device 106 (and thus the user 102) from unwanted location and/or identity exposure in the network.

Additionally, during the secure web browsing session, the user 102 may select one or more egress nodes 110 (e.g., router outputs through which an IP data packet (e.g., the web content) enters a public network such as the Internet (e.g., the network)) through which the web content, as well as any other data transmitted and/or received during the secure web browsing session, is to be routed. The one or more egress nodes 110 may each have a different location and/or identity than the secure analysis application 104, the user device 106, and/or the one or more secure web containers 108 in the network. As such, selecting the one or more egress nodes 110 through which web content is to be routed provides an additional layer of security and anonymity.

For example, when the user 102 accesses the web content via the secure analysis application 104, a selected secure web container 108 (e.g., secure web container 1 of FIG. 1), and a selected egress node 110 (e.g., egress node 1 of FIG. 1), only the identity and/or the location of the selected egress node 110 may be exposed in the network (as opposed to the location and/or the identity of the secure analysis application 104, the user device 106, and/or the selected secure web container 108). By not sharing the location and/or the identity of the secure analysis application 104, the user device 106, and/or the selected secure web container 108 and instead only sharing the location and/or the identity of the selected egress node 110, the location and/or the identity of the user 102 may be effectively protected during the secure web browsing session.

As illustrated in FIG. 1, the web content may be accessed from one or more web servers 112, which are configured to receive web content requests from the one or more egress nodes 110. However, even though the user 102 may initiate a web content request via the secure analysis application on the user device 206 and using the one or more secure web containers 108, only the location and/or the identity of the one or more egress nodes 110 (and not the locations and/or identities of the secure analysis application 104, the user device 106, and/or the one or more secure web containers 108) may be identified by the one or more web servers 112 upon receipt of the web content request.

Because the location and/or the identity of the one or more secure web containers 108 (as well as the secure analysis application 204 and the user device 206) may not be provided to and/or identified by the one or more content servers 112, the one or more content servers 112 may be unaware of the web content's final destination location and/or identity. Further, the one or more content servers 112 may be unaware of any processing, and/or requests (e.g., application programming interface (API) requests) to be performed to the web content. In this way, the user 102 may utilize the secure analysis application 104 to modify, change, select, and/or otherwise control the location and/or identity provided to various devices (e.g., web servers 112) on the network.

For example, upon receipt of the web content from the one or more web servers 112, the one or more secure web containers 108 may process the web content to identify and/or extract text included in the web content. The one or more secure web containers 108 may then transmit the extracted text to a translation service 114 for translation. In some embodiments, the translation service 114 may be performed and or operated by a third party device.

Because the one or more secure web containers 108 extracted and transmitted text from the web content to the translation service 114 (as opposed to simply transmitting the web content and/or a universal resource locator (URL) of the web content to the translation service 114), the translation service 114 may be unaware of the web content's origin location and/or identity. In this way, embodiments described herein provide a "double-blind" manner of providing an anonymous translation service of the web content (e.g., a web page that includes text) in the sense that both the provider of the web content (e.g., the one or more web servers 112) and the translator of the web content (e.g., the translation service 114) are unaware of each other, as well as any actions previously and/or to be performed to the web content.

After translation of the text is completed by the translation service 114, the one or more secure web containers 108 may receive translated text (e.g., a transformed version of the text extracted from the web content) from the translation service 114. The one or more secure web containers 108 may generate transformed web content (e.g., a web page that displays text in a language different than the language of the text extracted from the web content) using the translated text. In this manner, the user 102 may utilize various elements described herein to perform anonymous text translations of text included in web content (e.g., web pages) and to generate transformed web content based on the text translations.

The one or more secure web containers 108 may transmit the web content, extracted text, translated text, transformed web content, location and/or identity information associated with the user 102, the secure analysis application 104, the user device 106, the one or more secure web containers 108, the one or more egress nodes 110, the one or more web servers 112, and/or the translation service 114, user preferences, settings, and/or any other data to a cloud-based storage platform 116 for storage. The user 102 may access any data stored in the cloud-based storage platform 116 using the secure analysis application 104 and/or the one or more secure web containers 108.

System Description

As described above, the user 102 may initiate the secure analysis application 104 from the user device 106 (e.g., a local machine such as a laptop, a desktop, a computing device, a mobile device, and/or the like), which may communicate with a diem interface to instantiate one or more secure web containers 118. The secure web containers 108, the client interface, and/or the secure analysis application 104 may be located on a single host machine (e.g., computing device) and/or may lye distributed across a networked group of host machines.

Each secure web container 108 may have storage and/or processing capabilities as described herein to access web content, websites, web-based applications, and other resources hosted on web servers 112, respectively, on behalf of the user 102 of the user device 106. The secure web containers 108 may transcode data received from the web servers 112 to be securely presented to the user 102 at the user device 106 via the secure analysis application 104. This allows code from a web server 112 to be executed in a "sandbox" environment provided by a secure web container 108 instead of the user device 106, while still allowing the user to view and interact with content from the web server 112. Each secure web container 108 may be independently configurable and may be isolated from other secure web containers 108, including those residing upon a common host machine. By providing a highly isolated environment, each secure web container 108 minimizes the risks associated with accessing potentially dangerous web content for both the user device 106 and the secure analysis application infrastructure (e.g., including the plurality of secure web containers 108 and/or the secure analysis application 104). For example, each secure web container 108 may be isolated from the other secure web containers 108 in part, by having separate and transient session data that may be purged at the end of each session.

Furthermore, the user 102 of the user device 106 may simultaneously launch and operate multiple isolated sandbox environments (e.g., secure web containers 108) within the same user session (e.g., a period of time when the user is using the secure analysis application 104), each running a particular configuration of a remote browser provided by the secure web containers 108. Accordingly, the user 102 may access the same or different web servers 112 via egress nodes 110 with differently configured remote browsers simultaneously and independently. This allows the user 102 to have increased flexibility in crafting their digital identity when accessing web servers 112.

Browser Location

For jurisdictional or other reasons, it may be beneficial to control the physical location (e.g., IP address, physical processing device and/or storage device) of each secure web container 108 that acts as a remote browser to render or execute web content from a web resource (e.g., a web server 112). Multiple servers or other hardware for providing secure web containers 108 may be physically distributed across a region or even globally to provide this level of control.

Because multiple locations in the network (e.g., across an organization) may be available for utilization and/or routing by the secure analysis application 104, the secure web containers 108, and/or the egress nodes 110, a system administrator and/or the user 102 may select a particular browser location in the network for each of the secure analysis application 104 and/or the secure web container 108, as well as the one or more egress nodes 110, through which web content and/or information may be transmitted and/or routed. Additionally or alternatively, individual users 102 may, in some embodiments, select a specific network location for the secure analysis application 104, the secure web containers 108, and/or the egress nodes 110 when beginning a new session and/or instantiating a secure web container 108.

The secure web container's location may not necessarily be available to the web servers 130 that are accessed. Instead, an egress node, as described below, may be used to prevent the web servers 130 from determining the location of the secure web container 120 (e.g., browser location) or the location of the user's user device 106.

Egress Node

As described above, the secure analysis application 104 and/or the secure web containers 108 may utilize a plurality of selectable egress nodes 110 through which the web content may be routed. An egress node 110 is a node by which an IP packet (e.g., having an HTTP GET method) enters into a public network (e.g., the Internet).

There are many scenarios where the user 102 may not want personally identifying information (e.g., their IP address and location, identity information, and/or the like) to be known by a web server 112 when requesting web content and may thus benefit from masking and/or modifying his/her digital persona. Furthermore, there may be advantages to selecting a particular egress node 110 location independently from the location of the user device 106 and/or the secure web containers 108. For example, web servers 112 may be able to alter the presentation of the web content or even the web content itself based on the perceived egress node 112 from Which a request arrives. This may allow a malicious website, for example, to selectively expose the user 102 to malignant code based on their perceived egress node 112 and apparent location. When evaluating the potential threats of a website, the user 102 may thus benefit from being able to change their egress node 112, thereby changing their apparent location. It may be noted that this is but one of many scenarios where customizable attribution may be beneficial information security applications may be improved by this functionality, in that customizable attribution may benefit internal reliability or security testing of a company's own web resources.

As shown in FIG. 1, the secure analysis application 104 may utilize various secure web containers 108 (e.g., remote web browsers) and/or various egress nodes 110, all of which may be provided by a networking infrastructure distributed across multiple regions or even globally (e.g., on separate devices). In some embodiments a system administrator may allow the user 102 (e.g., an information security researcher) of the user device 106 to select a location for one or more of the secure web containers 108 and/or the egress nodes 110 when the user 102 begins a new session of the secure analysis application 104. The user's choice may be regionally limited by a specified range (e.g., within the continental United States). In some embodiments, the system administrator may provision a particular secure web container 108 and/or egress node 110 for utilization by the user 102 during a secure web browsing session. If neither the user 102 nor the system administrator specify a location for the secure web containers 108 and/or the egress nodes 110, a default secure web container 108 and/or egress node 110 may be automatically provided for routing web content from one or more web servers 112 during a secure web browsing session.

In some embodiments, an egress node 110 may be randomly selected for a session to avoid repeated access that might provoke suspicion from a targeted web server's administrator. The pool of egress nodes 210 from which a randomly selected egress node 210 may be chosen may share common traits such as region.

While the secure web containers 108, which may receive web content and execute web code from the web server 112 via one or more egress nodes 110, may prevent the web server 112 from determining the location of the user's user device 106, the selected egress node 110 may prevent the web server 112 from determining the location of even the secure web container 108. By allowing an egress node 110 to be located in the network separately and independently from the host machine hosting the secure web container 108 and/or the user device 106, the disclosed principles provide increased flexibility in establishing both remote browser locations (e.g., for jurisdictional reasons) and apparent locations (e.g., for probing the web server 112 with customizable attribution information).

In some embodiments, an organization having users of the secure analysis application may receive an expandable package (e.g., from the secure analysis application provider) that enables a system administrator or user of the organization to create and provide their own egress node 110 whenever and wherever they choose (e.g., on an user-provided machine and/or user device 106). This manually-generated egress node 110 may securely bind with the secure analysis application and may be disabled after one or more uses.

Browser Fingerprint

When the user accesses a website (e.g., web content) through a device (e.g., the user device 106), the web server 112 underlying the website may receive a browser fingerprint that defines various aspects of the device 106. For example, the browser fingerprint may describe the type of web browser, operating system, language support, plug-ins (including version designation), resolution, location, time zone, rendering capabilities of the user device 106, and/or an identity of the user 102. This information may be useful for a website (e.g., the web server 112) to provide a compatible presentation of web content.

However, utilizing a secure web container 108 and/or an egress node 110 during a browsing session may prevent the browser fingerprint of the user device 106 from being presented to the web server 112. Instead, locations and/or identities associated with the secure web container 108 and/or the egress node 110 may be provided to the web server 112 (even though the user 102 is accessing the web content via the secure analysis application 104 running on the user device 106) to thereby provide a complete, consistent, and/or credible anonymous identity for the user 102.

The secure analysis application 104 and/or the secure web containers 108 may comprise and/or communicate with a database (e.g., cloud-based storage platform 116) for storing default browser fingerprints that are organized by apparent location (e.g., as established by a secure web container 108 and/or an egress node 110). The database may be created by determining browser fingerprints that are most characteristic of a typical user device accessing the web content so that the user 102 is unlikely to stand out (e.g., is not suspicious) to the web server 112 during the browsing session.

The secure analysis application 104 may allow other elements of the browser fingerprint (e.g., an operating system, a type and/or location of web browser provided by the secure web containers 108, a type and/or location of an egress node 110, and/or the like) to be altered by a system administrator and/or the user 102. Certain high-level information (e.g., operating system information, browser information, software vendor information, user information, and/or the like) are generally contained within a user agent string that is placed in the header of outgoing messages. These elements are often more easily alterable. A system administrator and/or the user 102 may set policies within a policy database associated with the secure analysis application 104 (e.g., cloud-based storage platform 116), where the policies may allow the user 102 to change certain elements of the user agent information before or even after starting a session of the application.

In some embodiments, the browser fingerprint may be randomly assigned for a session. This randomly assigned browser fingerprint may be selected from a pool of browser fingerprints which may each potentially correspond with the selected secure web containers 108 and/or selected egress nodes 110 associated with the session (e.g., as selected by the user 102, by the system administrator, or randomly).

Translation

As described above, the translation service 114 may be integrated with the secure analysis application 104 by communicating with the secure web containers 108. In many scenarios, a web server 112 may provide textual web content that is in a different language than desired by the user 102 at the user device 106. The secure analysis application 104 may help enable the translation of web content from the web server 112 without alerting and/or directly contacting the web server 130 with an external web translation request.

When the user 102 chooses to view a web page having foreign language text, the user 102 may send a request specifying the requested web content to the web server 112 via the secure analysis application 104 and/or the secure web container 108. For example, the request could be an HTTP GET message requesting content and may be routed from the secure web container 108 to the web server 112 by way of a particular egress node 110. The secure web container 108 may enable the user 102 to specify a preferred language for content to be translated into and received by the user 102. In some embodiments, the preferred language may be established during the initiation of the session associated with the secure web container 108.

The secure web container 108 may send a modified request to the web server 112, where identifying information (e.g., user agent information) of the user device 106 is removed and/or replaced with information associated with the secure web container 108 and/or the egress node 110 through which the request is routed and/or the web content is routed. This request may also be sent through a selectable or randomized egress node 110 (not shown), as described above.

The secure web container 108 may receive the requested content from the web server 112 through the egress node 110. The secure web container 108 may analyze the received content to identify textual content. If the secure analysis application 108 detects that the language of the identified textual content is different from a preferred language as specified by the user 102, the identified textual content and preferred language may be sent in a translation request to the translation service 114. It would also be possible for the secure analysis application to send all textual content associated with a particular web page through the translation service 114 based on pre-configured information.

In some embodiments, the translation service 114 may provide an application programming interface (API) for sending and receiving information, and the translation request may be an API call. The secure web container 108 may receive translated textual content from the translation service 114. The secure web container 108 may then render a full presentation of requested content using the translated textual content (e.g., replacing the initially detected textual content with the translated textual content received from the translation service 114). In this manner, the user 102 may then view the requested content in the preferred language.

Alternatively, the user 102 of the user device 106 may first view the secure web container's 108 rendering of the web content in its native language (e.g., untranslated textual content). The user 102 may then request the secure web container 108 to provide translations for some or all of the textual content. The secure web container 108 may then communicate with the translation service 114 as described above to obtain the translated textual content and may then re-render a presentation for the viewing via the secure analysis application 104 running on the user device 106, having at least some of the textual content in the preferred language.

As the translation service 114 does not communicate directly with the web server 112, the web server 112 may be unaware that any translation is being performed. Instead, the web server 112 may merely detect a content request from the secure web container 108 (or a corresponding egress node 110) that resembles other requests typically received by the web server 112. Similarly, the translation service 114 may be unaware that the textual content was extracted from a particular web page.

Cloud-Based Storage

As described above, the secure analysis application 104 and/or the secure web container 108 may be integrated with a temporal or persistent cloud-based storage platform 116 capable of storing both transient and persistent data. In some scenarios, the user 102 may want to store web content and/or textual content downloaded from a web server 112 for analysis, or other purposes. However, locally storing these files on the user device 106 may be non-ideal for various reasons including the sensitivity of the information contained in the files or the potential for the content to be malicious in nature.

To avoid resorting to storage on the user device 106 while still maintaining their transient and secure properties, secure web containers 108 may be securely integrated with the cloud-based storage platform 116 as described herein. For example, web content received by the secure web container 108 from the web server 112 may be sent to the storage platform 116 to be stored even after a session involving the secure web container 108 is completed.

The cloud-based storage platform 116 may then store the content, either permanently or temporarily, and may ensure that the content can only be accessed from authorized secure web containers 108 and not from other clients such as a local browser. Accordingly, the cloud-based storage platform 116 may be one mechanism by which data may securely persist after the secure web container 108 is collapsed and/or deactivated. The content may be accessed by the same user 102 or by a different user through a second secure web container 108-2 and a second user device (not pictured) at a later time.

The cloud-based storage platform 116 may be implemented with multiple layers to enhance security. In some embodiments, the cloud-based storage platform 116 may have encrypted data stores having nondescript naming conventions and flat or otherwise obfuscated directory structures. Additionally, the placement of new files within these data stores may be random or otherwise obscured. The files on the data stores may be encrypted through a variety of techniques. In some embodiments, the data stores may be encrypted using symmetric keys that are centrally managed by the provider of the secure analysis application 104. In other embodiments, the data stores may be asymmetrically encrypted using public keys provided by an end user, such that only the end user (and not even the secure analysis application provider) may privately access the files within the data store. As the contents of the data store may be encrypted, the files and directory stored by the data store may not be directly browsable (e.g., without a mapping table and/or an encryption key). Therefore, unauthorized systems such as a local browser, may be restricted from viewing the contents, and even the file directory or any other logical representation, associated with the data store. Accordingly, the data store itself may be conveniently stored in a third-party storage layer (e.g., Amazon's Simple Storage Service (S3)), within near or within a user's physical premises, or other storage locations. The cloud-based storage platform 116 may further comprise a mapping table linked to the encrypted data stores. In some embodiments, the mapping table 514 may provide a meaningful data structure and set of file names for the data located in the encrypted data stores. The mapping table may, in some embodiments, be stored and provided by the secure analysis application provider.

In some embodiments, the above-described security features (e.g., encryption, random file placement, obfuscated directory structures) may all be implemented, and in other embodiments, a subset of the security features may be implemented in combination. Numerous other security features may additionally or alternatively be implemented.

The data stores of the cloud-based storage platform 116 may be divided into separate classes. For example, some data stores may be persistent whereas other data stores may be ephemeral or transient. This may provide greatly increase flexibility in establishing and enforcing data retention rules. For example, in some embodiments, a system administrator may want to restrict content that is associated with a particular secure web container, user, or web server from being stored for more than a certain amount of time. As such, content failing into this scope may be automatically placed within a transient data store of the cloud-based storage platform 116 where it may be deleted after a set amount of time or at a particular date and time. In some scenarios, a transient data store may expire at the end of a session or after a set number of web browsing sessions.

The cloud-based storage platform 116 may restrict access to the data that it contains. For example, the cloud-bused storage platform 116 may be provisioned at an organization level, with portions dedicated to individual users and other portions acting as shared drives between multiple users or even an entire organization. A system administrator and/or the user 102 may select the geographic region or regions for the physical locations of the data store(s) used for their organization (e.g., for jurisdictional and/or user policy reasons).

The secure web containers 108 may provide users with file browsers for accessing the encrypted data store(s) within the cloud-based storage platform 116. The file browsers may also be used to upload files to a third-party service (not pictured) such as a file analysis service. The cloud-based storage platform 116 may further provide a secure external application programming interface (API) that allows individuals and organizations to pull data from or push data to the encrypted data stores without using the secure web containers 108.

The cloud-based storage platform 116 may be configurable by the user 102 or system administrators to accommodate many different scenarios. For example, a set of stored files may be restricted to a single user who may re-instantiate her/his secure web container 108-1 to access the content. The user 102 may also choose to share folders or particular files initially allocated to her/him with other users within an organization. When sharing data, the user 102 may specify a time period for which the data may be shared with another user, or the user 102 may share the data indefinitely. In addition, the user 102 may restrict certain file rights. These file rights may include downloading a shared file from the data store (e.g., to their secure web container 108), executing a shared file, editing a shared file, uploading to a shared folder, and printing a shared file, among other file rights. The user 102 or system administrators within an organization may also configure data retention rules, such that data is removed from the cloud-based storage platform 116 after an established period of time or a deletion-triggering event, as discussed above.

In some embodiments, the cloud-based storage platform 116 may be configured by policy to interact with the file system of the secure analysis application 104 and/or the user device 106. If the system administrator enables this interaction, then the user 102 may have the ability to transfer content between her/his user device 106 and the cloud-based storage platform 116 (e.g., both upload and download). Conversely, a policy may restrict interaction between the user device 106 and the cloud-based storage platform 116, so that users may be able to download content to the cloud-based storage platform 116 when visiting web servers 112 via the secure analysis application 104 and/or the secure web container 108 but may not be permitted transfer files between the file system of the user device 106 and/or the secure web container 108 and the cloud-based storage platform 116 in either direction.

Encrypted Logging

Session data that is accumulated during the use of a secure web container 108 may generally be purged from the secure web container after the session is complete. However, in some embodiments, log entries corresponding to the sessions may be stored and compiled in a log database (e.g., cloud-based storage platform 116) before or upon session completion. For example, the log database may store log entries corresponding to each session for internal analysis or record keeping (e.g., within an organization associated with the secure analysis application 104).

In some embodiments, the log databases may retain log entries for a set time period and/or on a rolling basis (e.g., 90 days) before log entries are automatically deleted. The log entries may include various types of data including user data and session data (e.g., host machine identifiers, access times, and/or session durations). The log entries may also have a parameter indicating the organization to which they belong. This organization-level separation allows a system administrator (e.g., the user 102) within an organization to establish the particular types of data that are jogged as well as the period for which different types of logged data are stored for their organization.

Furthermore, the system administrator may provide a public key to the log database for encrypting their organization's logs. The system administrator may subsequently request and receive their encrypted logs through an external application programming interface (API) of the now-encrypted log database. The encrypted logs may then be decrypted within the system administrator's local network or on their local machine through a private key that matches the public key provided to the log database for encryption. Other encryption systems may be implemented to ensure that access to the encrypted logs is restricted to those having the correct credentials (e.g., system administrators within an organization to which the logs relate).

In some embodiments, the system administrator may increase the granularity of the data captured and stored within their encrypted log database. For example, logging functionality may be increased to include user navigation data (e.g., the web resources accessed, with time stamps), administrative changes to the secure analysis application's configuration, authentication events, session events, and web form post data (e.g., data provided to web resources).

Computing Architecture

Figure 2:
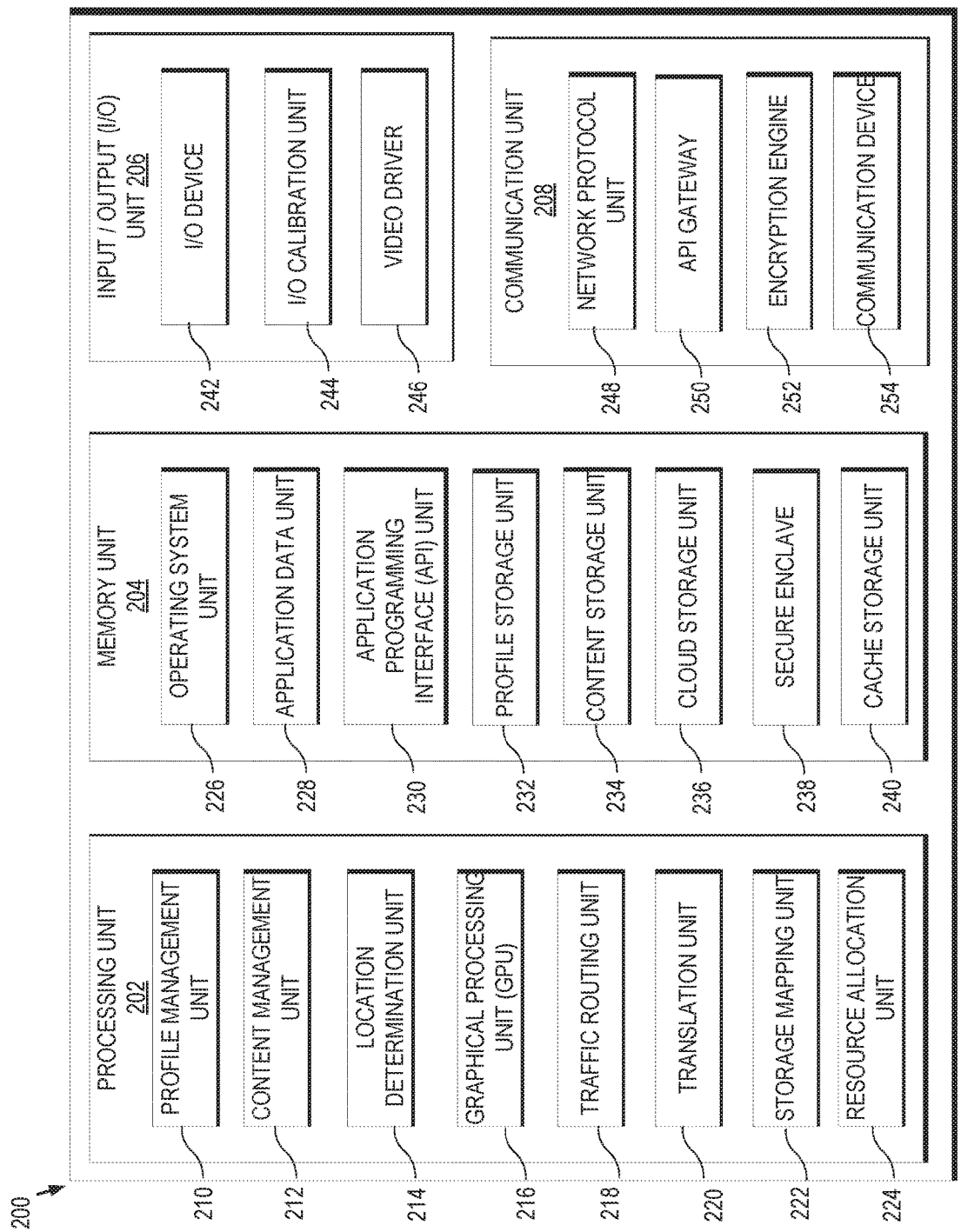
FIG. 2 shows an exemplary computing environment for providing a secure analysis application, in accordance with some embodiments of the disclosure.

Referring now to FIG. 2, FIG. 2 illustrates an exemplary computing environment 200 for providing secure web browsing sessions and anonymous translation services as described herein. For example, the computing environment 200 may be included in and/or utilized by the user device 106 the secure analysis application 104, the secure web containers 108 the egress nodes 110, the web servers 111 the translation service 114, and/or the cloud-based storage platform 116 of FIG. 1, and/or any other device described herein. Additionally, any units and/or subunits described herein with reference to FIG. 2 may be included in one or more elements of FIG. 1. The computing environment 200 and/or any of its units and/or subunits described herein may include general hardware, specifically-purposed hardware, and/or software.

The computing environment 200 may include, among other elements, a processing unit 202, a memory unit 204, an input/output (I/O) unit 206, and/or a communication unit 208. As described herein, each of the processing, unit 202, the memory unit 204, the I/O unit 206, and/or the communication unit 208 may include and/or refer to a plurality of respective units, subunits, and/or elements. Furthermore, each of the processing unit 202, the memory unit 204, the I/O unit 206, and/or the communication unit 208 may be operatively and/or otherwise communicatively coupled with each other so as to facilitate the political content communication and audio-visual analysis techniques described herein.

The processing unit 202 may control any of the one or more units 204, 206, 208, as well as any included subunits, elements, components, devices, and/or functions performed by the units 204, 206, 208 included in the computing environment 200. The processing unit 202 may also control any unit and/or device included in the system 200 of FIG. 2. Any actions described herein as being performed by a processor may be taken by the processing unit 202 alone and/or by the processing unit 202 in conjunction with one or more additional processors, units, subunits, elements, components, devices, and/or the like. Additionally, while only one processing unit 202 may be shown in FIG. 2, multiple processing units may be present and/or otherwise included in the computing environment 200. Thus, while instructions may be described as being executed by the processing unit 202 and/or various subunits of the processing unit 202), the instructions may be executed simultaneously, serially, and/or by one or multiple, processing units 202 in parallel.

In some embodiments, the processing unit 202 may be implemented as one or more computer processing unit (CPU) chips and/or graphical processing unit (GPU) chips and may include a hardware device capable of executing computes instructions. The processing unit 202 may execute instructions, codes, computer programs, and/or scripts. The instructions, codes, computer programs, and/or scripts may be received from and/or stored in the memory unit 204, the I/O unit 206, the communication unit 208, subunits and/or elements of the aforementioned units, other devices and/or computing environments, and/or the like. As described herein, any unit and/or subunit (e.g., element) of the computing environment 200 and/or any other computing environment may be utilized to perform any operation. Particularly, the computing environment 200 may not include a generic computing system, but instead may include a customized computing system designed to perform the various methods described herein.

In some embodiments, the processing unit 202 may include, among other elements, subunits such as a profile management unit 210, a content management unit 212, a location determination unit 214, a graphical processing unit (GPU) 216, a traffic routing unit 218, a translation unit 220, a storage mapping unit 222, and/or a resource allocation unit 224. Each of the aforementioned subunits of the processing unit 202 may be communicatively and/or otherwise operably coupled with each other.

The profile management unit 210 may facilitate generation, modification, analysis, transmission, and/or presentation of a user profile associated with a user. For example, the profile management unit 210 may prompt a user via a user device to register by inputting authentication credentials, personal information (e.g., an age, a gender, and/or the like), contact information (e.g., a phone number, a zip code, a mailing address, an email address, a name, and/or the like), and/or the like. The profile management unit 210 may receive, process, analyze, organize, and/or otherwise transform any data received from the user and/or another computing element so as to generate a user profile of a user that includes personal information, contact information, user preferences, a photo, a video recording, an audio recording, a textual description, a virtual currency balance, a history or log of user activity, user preferences, settings, and/or the like. In some embodiments, the profile management unit 210 may enable a user to input desired settings associated with a web browsing session.

The content management unit 212 may facilitate generation, modification, analysis, transmission, and/or presentation of web content. For example, the content management unit 212 may control the audio-visual environment and/or appearance of application data and/or web pages during execution of various processes. Web content for which the content management unit 212 may be responsible may include advertisements, images, text, themes, audio files, video files, documents, and/or the like. In some embodiments, the content management unit 212 may also interface with a third-party content server and/or memory location for identifying, receiving, transmitting, and/or distributing content to one or more users.

The location determination unit 214 may facilitate detection, generation, modification, analysis, transmission, and/or presentation of location information. Location information may include global positioning system (GPS) coordinates, an Internet protocol (IP) address, a media access control (MAC) address, geolocation information, an address, a port number, a zip code, a server number, a proxy name and/or number, device information (e.g., a serial number), and/or the like. In some embodiments, the location determination unit 214 may include various sensors, a radar, and/or other specifically-purposed, hardware elements for enabling the location determination unit 214 to acquire, measure, and/or otherwise transform location information. The location determination unit 214 may identify and/or control a location of the user device, the secure analysis application, the secure web containers, the egress nodes, the web servers, the translation service, and/or the cloud-based storage system as described herein.

The GPU unit 216 may facilitate, generation, modification, analysis, processing, transmission, and/or presentation of visual content (e.g., web content as described above). In some embodiments, the GPU unit 216 may be utilized to render visual content, such as a web page, for presentation on the user device. The GPU unit 216 may also include multiple GPUs and therefore may be configured to perform and/or execute multiple processes in parallel.

The traffic routing unit 218 may facilitate determination, monitoring, analysis, and control of how data (e.g., web content, and/or the like) is routed throughout the devices described herein and/or the network as a whole. Various devices, such as routers, switches, computing devices, and/or the like may be controlled by the traffic routing unit 218. In some embodiments, the traffic routing unit 218 may facilitate the transmission, receipt, modification, and/or processing of data throughout the network. In some embodiments, the traffic routing unit 218 may determine one or more locations in the network through which data is to be routed (e.g., a particular secure web container and/or an egress node).

The translation unit 220 may facilitate the translation, transformation, modification, and/or processing, of textual content. In some embodiments, the translation unit 220 may enable the translation service 114 to translate text provided by the secure web container from a first language into a second language. The translation unit 220 may utilize a variety of text processing functionalities to enable the secure web container to identify and/or extract text included in web content.

The storage mapping unit 222 may facilitate the transmission, receipt, storage, saving, and/or archiving of data in the cloud-based storage platform as described herein. The storage mapping unit 222 may interface with the memory unit 204 and control various subunits of the memory unit 204. In some embodiments, the storage mapping unit 222 may control read; write functionality of various subunits of the memory unit 204 based on jurisdiction and/or policy (e.g., user privileges). The storage mapping unit 222 may also include a variety of data distribution functionalities so that incoming data, such as web content, textual content, and/or usage and/or activity data may be appropriately saved. In some embodiments, the storage mapping unit 222 may further include security measures for securing data stored in the memory unit 204 as described herein.

The resource allocation unit 224 may facilitate the determination, monitoring, analysis, and/or allocation of computing resources throughout the computing environment 200 and/or other computing environments. For example, the computing environment 200 may facilitate a high volume of (e.g., multiple) web content requests and/or transmissions between a large number of supported devices, secure analysis applications, secure web containers, egress nodes, web servers, cloud-based storage platforms, and/or translation services so that a user may be enabled to initiate a plurality of web browsing sessions. As such, computing resources of the computing environment 200 utilized by the processing unit 202, the memory unit 204, the I/O unit, and/or the communication unit 208 (and/or any subunit of the aforementioned units) such as processing power, data storage space, network bandwidth, and/or the like may be in high demand at various times during operation. Accordingly, the resource allocation unit 224 may be configured to manage the allocation of various computing resources as they are required by particular units and/or subunits of the computing environment 200 and or other computing environments. In some embodiments, the resource allocation unit 224 may include sensors and/or other specially-purposed hardware for monitoring performance of each unit and/or subunit of the computing environment 200, as well as hardware for responding to the computing resource needs of each unit and/or subunit. In some embodiments, the resource allocation unit 224 may utilize computing resources of a second computing environment separate and distinct from the computing environment 200 to facilitate a desired operation.

For example, the resource allocation unit 224 may determine a number of simultaneous web content requests stemming from a plurality of secure web containers in a common web browsing session (or in a plurality of web browsing sessions). The resource allocation unit 224 may then determine that the number of simultaneous web content requests meets and/or exceeds a predetermined threshold value. Based on this determination, the resource allocation unit 224 may determine an amount of additional computing resources (e.g., processing power, storage space of a particular non-transitory computer-readable memory medium, network bandwidth, and/or the like) required by the processing unit 202, the memory unit 204, the I/O unit 206, the communication unit 208, and/or any subunit of the aforementioned units for enabling safe and efficient operation of the computing environment 200 while supporting the number of simultaneous web content requests, as well as transmission of the web content. The resource allocation unit 224 may then retrieve, transmit, control, allocate, and/or otherwise distribute determined amount(s) of computing resources to each element (e.g., unit and/or subunit) of the computing environment 200 and/or another computing environment.

In some embodiments, factors affecting the allocation of computing resources by the resource allocation unit 224 may include a volume of web content requests, a size of the web content, a duration of time during which computing resources are required by one or more elements of the computing environment 200, and/or the like. In some embodiments, computing resources may be allocated to and/or distributed amongst a plurality of second computing environments included in the computing environment 200 based on one or more factors mentioned above. In some embodiments, the allocation of computing resources of the resource allocation unit 224 may include the resource allocation unit 224 flipping a switch, adjusting processing power, adjusting memory size, partitioning a memory element, transmitting data, controlling one or more input and/or output devices, modifying various communication protocols, and/or the like. In some embodiments, the resource allocation unit 224 may facilitate utilization of parallel processing techniques such as dedicating a plurality of GPUs included in the processing unit 202 for processing web content requests and/or distribution of web content between multiple units and/or subunits of the computing environment 200 and/or other computing environments.

In some embodiments, the memory unit 204 may be utilized for storing, recalling, receiving, transmitting, and/or accessing various files and/or information operation of the computing environment 200. The memory unit 204 may include various types of data storage media such as solid state storage media, hard disk storage media, and/or the like. The memory unit 204 may include dedicated hardware elements such as hard drives and/or servers, as well as software elements such as cloud-based storage drives. For example, the memory unit 204 may include various subunits such as an operating system unit 226, an application data unit 228, an application programming interface (API) unit 230, a profile storage unit 232, a content storage unit 234, a cloud storage unit 236, a secure enclave 238, and/or a cache storage unit 240.

The memory unit 204 and/or any of its subunits described herein may include random access memory (RAM), read only memory (ROM), and/or various forms of secondary storage. RAM may be used to store volatile data and/or to store instructions that may be executed by the processing unit 202. For example, the data stored may be a command, a current operating state of the computing environment 200, an intended operating state of the computing environment 200, and/or the like. As a further example, data stored in the memory unit 204 may include instructions related to various methods and/or functionalities described herein. ROM may be a non-volatile memory device that may have a smaller memory capacity than the memory capacity of a secondary storage. ROM may be used to store instructions and/or data that may be read during execution of computer instructions. In some embodiments, access to both RAM and ROM may be faster than access to secondary storage. Secondary storage may be comprised of one or more disk drives and/or tape drives and may be used for non-volatile storage of data or as an over-flow data storage device if RAM is not large enough to hold all working data. Secondary storage may be used to store programs that may be loaded into RAM when such programs are selected for execution. In some embodiments, the memory unit 204 may include one or more databases (e.g., the cloud-based storage platform, the web servers, the secure web container, the user device, and/or the like) for storing any data described herein. Additionally or alternatively, one or more secondary databases located remotely from the computing environment 200 may be utilized and/or accessed by the memory unit 204.

The operating system unit 226 may facilitate deployment, storage, access, execution, and/or utilization of an operating system utilized by the computing environment 200 and/or any other computing environment described herein (e.g., a user device, a secure web container, a web server, a cloud-based storage platform, and/or a translation service). In some embodiments, the operating system may include various hardware and/or software elements that serve as a structural framework for enabling the processing unit 202 to execute various operations described herein. The operating system unit 226 may further store various pieces of information and/or data associated with operation of the operating system and/or the computing environment 200 as a whole, such as a status of computing resources (e.g., processing power, memory availability, resource utilization, and/or the like), runtime information, modules to direct execution of operations described herein, user permissions, security credentials, and/or the like.

The application data unit 228 may facilitate deployment, storage, access, execution, and/or utilization of an application utilized by the computing environment 200 and/or any other computing environment described herein (e.g., a user device, a secure web container, a web server, a cloud-based storage platform, and/or a translation service). For example, users may be required to download, access, and/or otherwise utilize a software application on a user device such as a smartphone in order for various operations described herein to be performed. As such, the application data unit 228 may store any information and/or data associated with the application (e.g., web browser, secure analysis application, secure web container, and/or the like). Information included in the application data unit 228 may enable a user to execute various operations described herein. The application data unit 228 may further store various pieces of information and/or data associated with operation of the application and/or the computing environment 200 as a whole, such as a status of computing resources (e.g., processing power, memory availability, resource utilization, and/or the like), runtime information, modules to direct execution of operations described herein, user permissions, security credentials, and/or the like.

The API unit 230 may facilitate deployment, storage, access, execution, and/or utilization of information associated with APIs of the computing environment 200 and/or any other computing environment described herein (e.g., a user device). For example, computing environment 200 may include one or more APIs for enabling various devices, applications, and/or computing environments to communicate with each other and/or utilize the same data. Accordingly, the API unit 230 may include API databases containing information that may be accessed and/or utilized by applications and/or operating systems of other devices and/or computing environments. In some embodiments, each API database may be associated with a customized physical circuit included in the memory unit 204 and/or the API unit 230. Additionally, each API database may be public and/or private, and so authentication credentials may be required to access information in an API database.

The profile storage unit 232 may facilitate deployment, storage, access, and/or utilization of information associated with user profiles of users by the computing environment 200 and/or any other computing environment described herein (e.g., a user device, a secure web container, a web server, a cloud-based storage platform, and/or a translation service). For example, the profile storage unit 232 may store one or more user's contact information, authentication credentials, user preferences, user history and/or log of behavior, personal information, location information, received input and/or sensor data, and/or metadata. In some embodiments, the profile storage unit 232 may communicate with the profile management unit 210 to receive and/or transmit information associated with a user's profile.

The content storage unit 234 may facilitate deployment, storage, access, and/or utilization of information associated with requested content by the computing environment 200 and/or any other computing environment described herein (e.g., a user device, a secure web container, a web server, a cloud-based storage platform, and/or a translation service). For example, the content storage unit 234 may store web content (e.g., one or more images, text, videos, audio content, advertisements, and/or metadata) to be presented to a user and/or processed during operations described herein. The content storage unit 234 may store web content that may be recalled by the secure web containers, the user device, and/or the web servers during operations described herein. In some embodiments, the content storage unit 234 may communicate with the content management unit 212 to receive and/or transmit content files from the web servers.

The cloud storage unit 236 may facilitate deployment, storage, access, analysis, and/or utilization of web content, user information, location information, and/or the like in a cloud-based storage platform as described herein. For example, the cloud storage unit 236 may store web content generated, transmitted, received, and/or stored by the computing environment 200. In some embodiments, the cloud storage unit 236 may communicate with the GPUs 216, the traffic routing unit 218, the translation unit 220, and/or the storage mapping unit 222 to facilitate storage and/or recall of web content and/or other information stored in the cloud storage unit 236.

The secure enclave 238 may facilitate secure storage of data. In some embodiments, the secure enclave 238 may include a partitioned portion of storage media included in the memory unit 204 that is protected by various security measures. For example, the secure enclave 238 may be hardware secured. In other embodiments, the secure enclave 238 may include one or more firewalls, encryption mechanisms, and/or other security-based protocols. Authentication credentials of a user may be required prior to providing the user access to data stored within the secure enclave 238. The secure enclave 238 may include and/or be included in the encrypted data stores and/or any other data store described herein.

The cache storage unit 240 may facilitate short-term deployment, storage, access, analysis, and/or utilization of data. For example, the cache storage unit 248 may serve as a short-term storage location for data so that the data stored in the cache storage unit 248 may be accessed quickly. In some embodiments, the cache storage unit 240 may include RAM and/or other storage media types that enable quick recall of stored data. The cache storage unit 240 may included a partitioned portion of storage media included in the memory unit 204.

As described herein, the memory unit 204 and its associated elements may store any suitable information. Any aspect of the memory unit 204 may comprise any collection and arrangement of volatile and/or non-volatile components suitable for storing data. For example, the memory unit 204 may comprise random access memory (RAM) devices, read only memory (ROM) devices, magnetic storage devices, optical storage devices, and/or any other suitable data storage devices. In particular embodiments, the memory unit 204 may represent, in part, computer-readable storage media on which computer instructions and/or logic are encoded. The memory unit 204 may represent any number of memory components within, local to, and/or accessible by a processor.

The I/O unit 206 may include hardware and/or software elements for enabling the computing environment 200 to receive, transmit, and/or present information. For example, elements of the I/O unit 206 may be used to receive user input from a user via a user device, present web content to the user via the user device, and/or the like. In this manner, the I/O unit 206 may enable the computing environment 200 to interface with a human user. As described herein, the I/O unit 206 may include subunits such as an I/O device 242, an I/O calibration unit 244, and/or video driver 246.

The I/O device 242 may facilitate the receipt, transmission, processing, presentation, display, input, and/or output of information as a result of executed processes described herein. In some embodiments, the I/O device 242 may include a plurality of I/O devices. In some embodiments, the I/O device 242 may include one or more elements of a user device, a computing system, a server, and/or a similar device.

The I/O device 242 may include a variety of elements that enable a user to interface with the computing environment 200. For example, the I/O device 242 may include a keyboard, a touchscreen, a touchscreen sensor array, a mouse, a stylus, a button, a sensor, a depth sensor, a tactile input element, a location sensor, a biometric scanner, a laser, a microphone, a camera, and/or another element for receiving and/or collecting input from a user and/or information associated with the user and/or the user's environment. Additionally and/or alternatively, the I/O device 242 may include a display, a screen, a projector, a sensor, a vibration mechanism, a light emitting diode (LED), a speaker, a radio frequency identification (RFID) scanner, and/or another element for presenting and/or otherwise outputting data to a user. In some embodiments, the I/O device 242 may communicate with one or more elements of the processing unit 202 and/or the memory unit 204 to execute operations described herein. For example, the I/O device 242 may include a display, which may utilize the GPU 216 to present web content to a user of a user device.

The I/O calibration unit 244 may facilitate the calibration of the I/O device 242. For example, the I/O calibration unit 244 may detect and/or determine one or more settings of the I/O device 242, and then adjust and/or modify settings so that the I/O device 242 may operate more efficiently.

In some embodiments, the I/O calibration unit 244 may utilize a video driver 246 (or multiple video drivers) to calibrate the I/O device 242. For example, the video driver 246 may be installed on a user device so that the user device may recognize and/or integrate with the I/O device 242, thereby enabling web content to be displayed, received, generated, and/or the like. In some embodiments, the I/O device 242 may be calibrated by the I/O calibration unit 244 by based on information included in the video driver 246.

The communication unit 208 may facilitate establishment, maintenance, monitoring, and/or termination of communications (e.g., a video streaming connection and/or distribution of political content) between the computing environment 200 and other devices such as user devices, the secure analysis application, the secure web containers, the egress nodes, the web servers, the cloud-based storage platform, the translation service, other computing environments, third party server systems, and/or the like. The communication unit 208 may further enable communication between various elements (e.g., units and/or subunits) of the computing environment 200. In some embodiments, the communication unit 208 may include a network protocol unit 248, an API gateway 250, an encryption engine 252, and/or a communication device 254. The communication unit 208 may include hardware and/or software elements. In some embodiments, the communication unit 208 may be utilized to transmit and/or receive web content as described herein.

The network protocol unit 248 may facilitate establishment, maintenance, and/or termination of a communication connection between the computing environment 200 and another device by way of a network. For example, the network protocol unit 248 may detect and/or define a communication protocol required by a particular network and/or network type. Communication protocols utilized by the network protocol unit 248 may include Wi-Fi protocols, Li-Fi protocols, cellular data network protocols, Bluetooth® protocols, WiMAX protocols, Ethernet protocols, powerline communication (PLC) protocols, Voice over Internet Protocol (VoIP), and/or the like. In some embodiments, facilitation of communication between the computing environment 200 and any other device, as well as any element internal to the computing environment 200, may include transforming and/or translating data from being compatible with a first communication protocol to being compatible with a second communication protocol. In some embodiments, the network protocol unit 248 may determine and/or monitor an amount of data traffic to consequently determine which particular network protocol is to be used for establishing a web browsing session, a network connection, distributing web content, transmitting data, and/or performing other operations described herein.

The API gateway 250 may facilitate the enablement of other devices and/or computing environments to access the API unit 230 of the memory unit 204 of the computing environment 200. For example, a user device may access the API unit 230 via the API gateway 250. In some embodiments, the API gateway 250 may be required to validate user credentials associated with a user of a user device prior to providing access to the API unit 230 to the user. The API gateway 250 may include instructions for enabling the computing environment 200 to communicate with another device.

The encryption engine 252 may facilitate translation, encryption, encoding, decryption, and/or decoding of information received, transmitted, and/or stored by the computing environment 200. Using the encryption engine, each transmission of data may be encrypted, encoded, and or translated for security reasons, and any received data may be encrypted, encoded, and/or translated prior to its processing and/or storage. In some embodiments, the encryption engine 252 may generate an encryption key, an encoding, key, a translation key, and/or the like, which may be transmitted along with any data content.

The communication device 254 may include a variety of hardware and/or software specifically purposed to enable communication between the computing environment 200 and another device, as well as communication between elements of the computing environment 200. In some embodiments, the communication device 254 may include one or more radio transceivers, chips, analog front end (AFE) units, antennas, processing units, memory, other logic, and/or other components to implement communication protocols (wired or wireless) and related functionality for facilitating communication between the computing environment 200 and any other device. Additionally and/or alternatively, the communication device 254 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

It is contemplated that the computing elements be provided according to the structures disclosed herein may be included in integrated circuits of any type to which their use commends them, such as ROMs, RAM (random access memory) such as DRAM (dynamic RAM), and video RAM (VRAM), PROMs (programmable ROM), EPROM (erasable PROM), EEPROM (electrically erasable PROM), EAROM (electrically alterable ROM), caches, and other memories, and to microprocessors and microcomputers in all circuits including ALUs (arithmetic logic units), control decoders, stacks, registers, input/output (I/O) circuits, counters, general purpose microcomputers, RISC (reduced instruction set computing), CISC (complex instruction set computing) and VLIW (very long instruction word) processors, and to analog integrated circuits such as digital to analog converters (DACs) and analog to digital converters (ADCs). ASICS, PLAs, PALs gate arrays and specialized processors such as digital signal processors (DSP), graphics system processors (GSP), synchronous vector processors (SVP), and image system processors (ISP) all represent sites of application of the principles and structures disclosed herein.

Implementation is contemplated in discrete components or fully integrated circuits in silicon, gallium arsenide, or other electronic materials families, as well as in other technology-based forms and embodiments. It should be understood that various embodiments of the invention can employ or be embodied in hardware, software, microcoded firmware, or any combination thereof. When an embodiment is embodied, at least in part, in software, the software may be stored in a non-volatile, machine-readable medium.

Networked computing environment such as those provided by a communications server may include, but are not limited to, computing grid systems, distributed computing environments, cloud computing environment, etc. Such networked computing environments include hardware and software infrastructures configured to form a virtual organization comprised of multiple resources which may be in geographically disperse locations.

In some embodiments, the network described herein may include any wireless and/or wired communications network that facilitates communication (e.g., transmission and/or receipt of between the computing environment 200 and any other device. For example, the one or more networks may include an Ethernet network, a cellular network, a computer network, the Internet, a wireless fidelity (Wi-Fi) network, a light fidelity (Li-Fi) network, a Bluetooth network, a radio frequency identification (RFID) network, a near-field communication (NFC) network, a laser-based network, and/or the like.

User Interface

Figure 3:
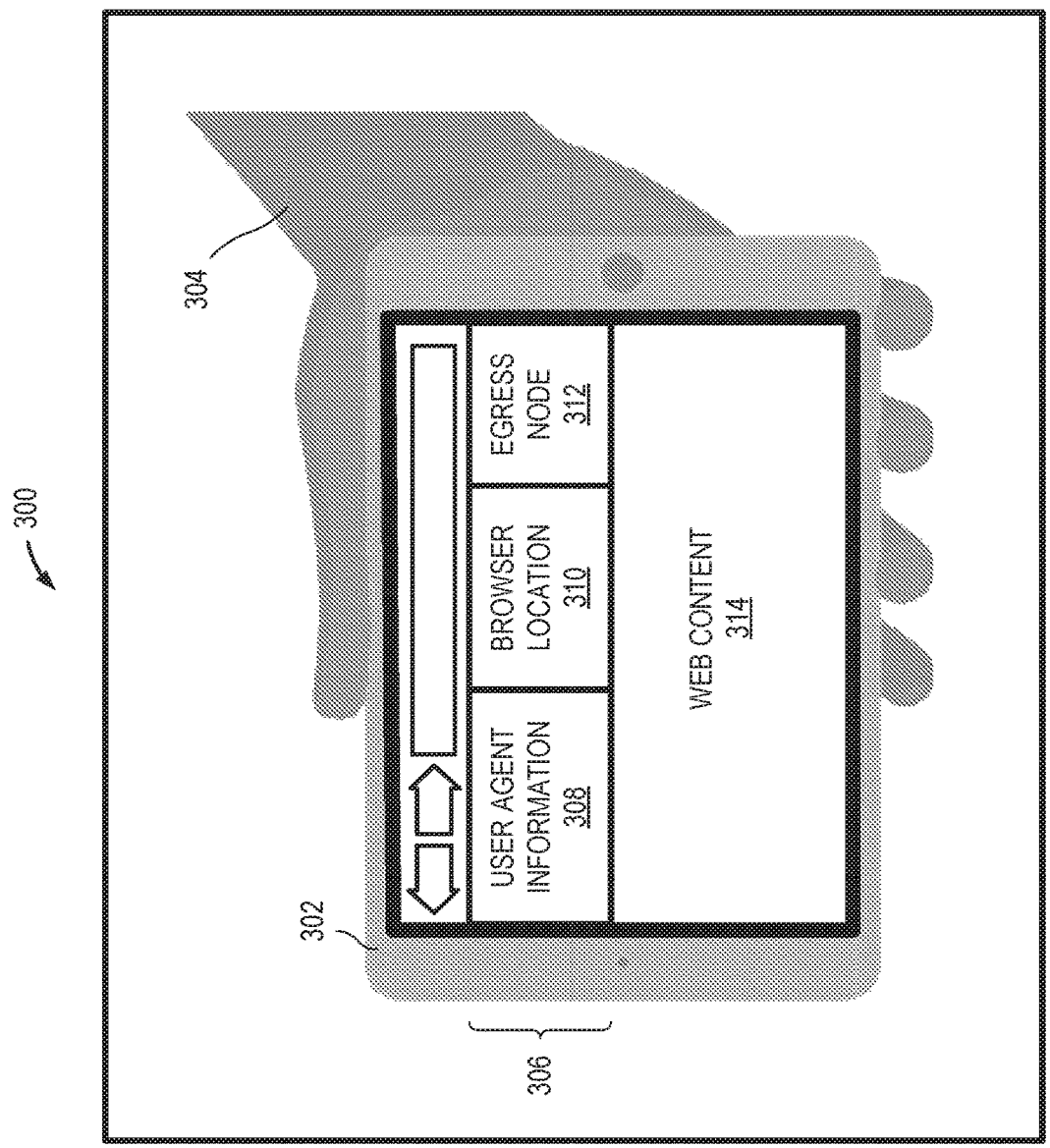
FIG. 3 shows an exemplary user interface of a secure web browsing experience, in accordance with some embodiments of the disclosure.

Referring now to FIG. 3, FIG. 3 shows an exemplary graphical interface 300 for a secure analysis application that may be presented on a user device 302 of a user 304. A user may instantiate multiple secure web containers in one common session of the secure analysis application. Each secure web container may correspond with a window displayed within the secure analysis application running on the user device 302.

As discussed above, the different secure web containers may have distinct configuration settings. As shown in FIG. 3, these configuration settings may be displayed within each window in a message bar 306 to allow the user 304 to track each browsing session more carefully. In some embodiments, the message bar 306 may include information associated with the session such as user agent information 308 (and/or other aspects of the browser fingerprint), a browser location 310 (e.g., the IP address and/or the regional location of the selected secure web container), and an egress node 312 location (e.g., the IP address and/or the regional location of the selected egress node). The user may adjust some or all of these settings by interacting with the message bar 306. Some settings, such as those pertaining to the egress node 312 may be adjusted before initiating a session, and some settings, such as the operating system, type of web browser and/or other user agent information 308 may be may be adjusted either before or during the session. In some embodiments, some or all of these settings may be pre-defined and fixed by a system administrator. In general, as a user may have multiple secure analysis application sessions and/or multiple secure web containers open simultaneously, the message bar 310 may help the user remember and preserve the separation of each session. Once a connection has been established between the user device 302 and a web server (e.g., a provider of content), web content 314 may be displayed on the user device 302.

Method Descriptions

Figure 4:
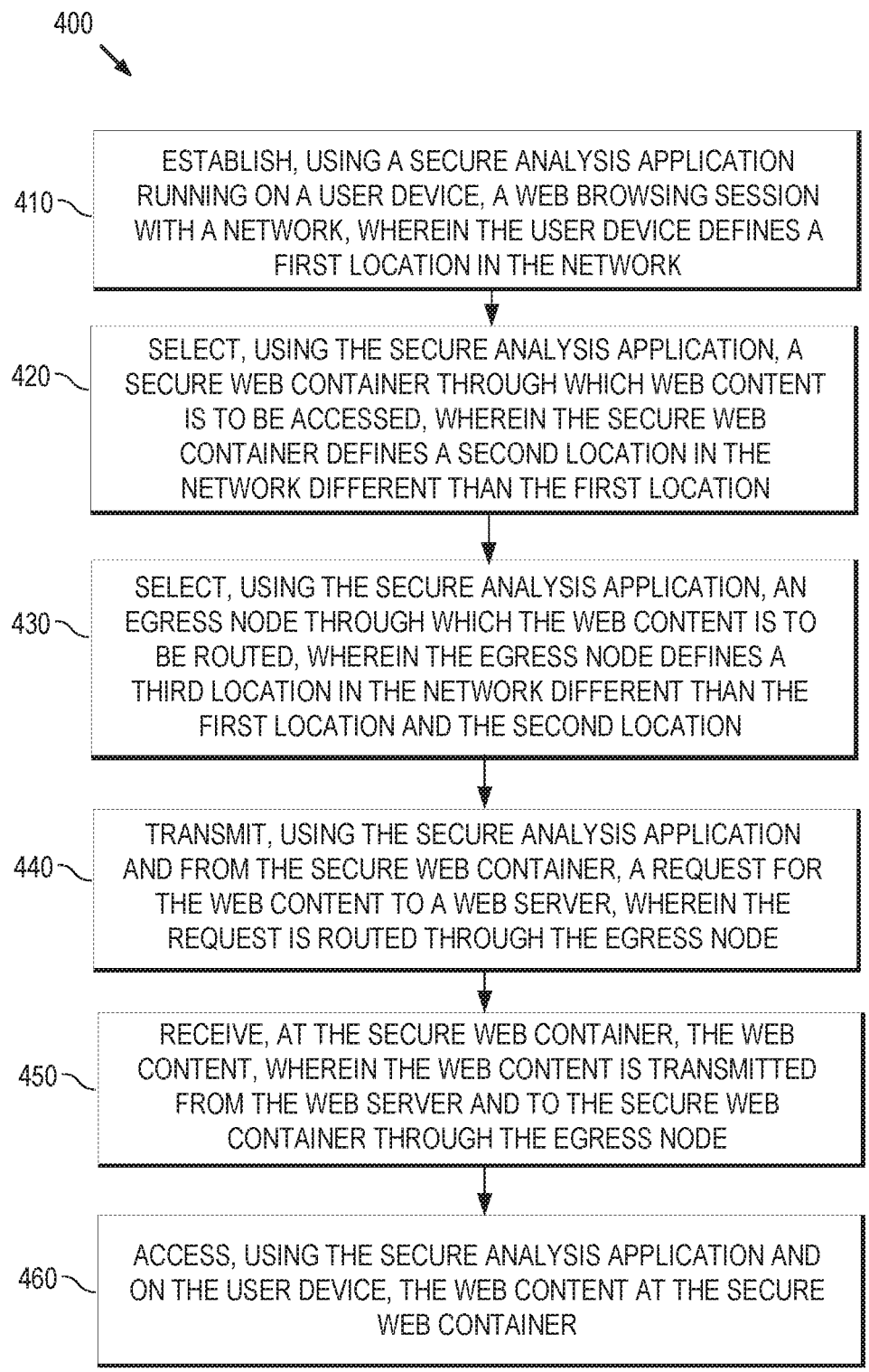
FIG. 4 shows an exemplary process flow for securely accessing web content, in accordance with some embodiments of the disclosure.

FIG. 4 shows an exemplary method 400 for performing operations associated with securely accessing web content as described herein. At block 410, the method 700 may include establishing, using a secure analysis application running on a user device, a web browsing session with a network, wherein the user device defines a first location in the network. At block 420, the method 400 may include selecting, using the secure analysis application, a secure web container through which web content is to be accessed, wherein the secure web container defines a second location in the network different than the first location. At block 430, the method 400 may include selecting, using the secure analysis application, an egress node through which the web content is to be routed, wherein the egress node defines a third location in the network different than the first location and the second location. At block 440, the method 400 may include transmitting, using the secure analysis application and from the secure web container, a request for the web content to a web server, wherein the request is routed through the egress node. At block 450, the method 400 may include receiving, at the secure web container, the web content, wherein the web content is transmitted from the web server and to the secure web container through the egress node. At block 460, the method 400 may include accessing, using the secure analysis application and on the user device, the web content at the secure web container.

Figure 5:
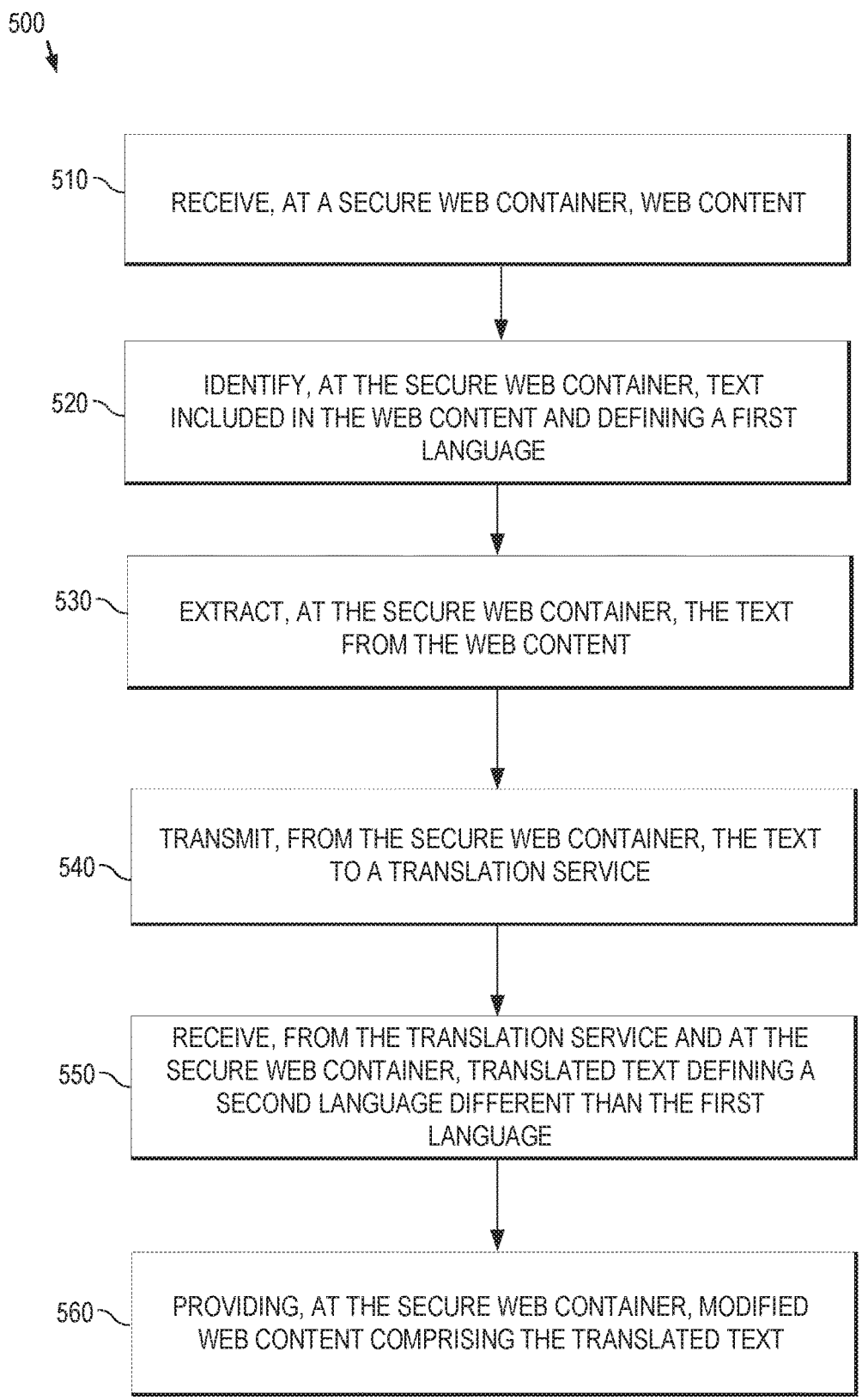
FIG. 5 shows an exemplary process flow for translating text included in web content, in accordance with some embodiments of the disclosure.

FIG. 5 shows an exemplary method 500 for performing operations associated with generating a score indicating relevance of political content to a user based on auditory emotional responses of the user as described herein. At block 510, the method 500 may include receiving, at a secure web container, web content. At block 520 the method 500 may include identifying, at the secure web container, text included in the web content and defining a first language. At block 530, the method 500 may include extracting, at the secure web container, the text from the web content. At block 540, the method 500 may include transmitting, from the secure web container, the text to a translation service. At block 550, the method 500 may include receiving, from the translation service and at the secure web container, translated text defining a second language different than the first language. At block 560, the method 500 may include providing, at the secure web container, modified web content comprising the translated text.

In some embodiments, a computing apparatus is provided defining a first location in a network and comprising: at least one memory comprising instructions; and at least one computing processor configured for executing the instructions, wherein the instructions cause the at least one computing processor to perform the operations of: establishing, using computing instructions comprised in the at least one memory, a web browsing session with the network; selecting, using a traffic routing software unit comprised in the at least one computing processor, a secure web container through which web content is to be accessed during the web browsing session, wherein the network comprises two or more secure web containers, and wherein a first secure web container, of the two or more secure web containers, is located in a first secure web container location of the network and a second secure web container, of the two or more secure web containers, is located in a second secure web container location of the network; selecting, using the traffic routing software unit, an egress node through which the web content is to be routed during the web browsing session, wherein the network comprises two or more egress nodes, and wherein a first egress node, of the two or more egress nodes, is located in a first egress node location of the network and a second egress node, of the two or more egress nodes, is located in a second egress node location of the network; and providing, via a communication connection between at least one of the two or more secure web containers and a user device defining a second location in the network, a user of the user device with secure access to the web content, wherein the web content is rendered or accessed at the secure web container, and wherein providing the user of the user device with the secure access to the web content comprises manipulating, at the secure web container, one or more elements of a browser fingerprint presented to or accessed by a web server associated with the web content such that a characteristic of the user device comprised in the manipulated browser fingerprint and/or a third location presented to or accessed by the web server is different from an actual characteristic of the user device and/or the second location, respectively.

In some embodiments, the instructions further cause the at least one computing processor to perform the operations of: generating, using a content management software unit of the at least one computing processor, a request to receive, at the secure web container, second web content from a second web server: and transmitting, using the traffic routing software unit, the request to the secure web container, wherein the request is transmitted to the web server from the secure web container via the network by routing the request through the egress node.

In some embodiments, the second web content is received at the secure web container from the second web server via the network in response to transmitting the request to the second web server.

In some embodiments, the instructions further cause the at least one computing processor to perform the operations of: identifying, using a translation software unit associated with the secure web container, text comprised in the second web content, wherein the text defines a first language; extracting, using the translation software unit, the text from the second web content transmitting, using the translation software unit, the text to a translation service for translation; and receiving, using the translation software unit and at the secure web container, translated text defining a second language different than the first language, wherein providing secure access of the second web content to a user of the computing apparatus comprises accessing the translated text using the translation software unit.

In some embodiments, the instructions further cause the at least one computing, processor to perform the operations of: storing, using a storage mapping software unit associated with the secure web container, at least one of the second web content, the text, and the translated text in a cloud-based storage platform.

In some embodiments, a non-transitory computer readable medium is provided defining a first location in a network and comprising code, wherein the code, when executed by at least one computing processor of a computing apparatus, causes the at least one computing processor to perform the operations of: establishing, using computing instructions comprised in the at least one memory, a web browsing session with the network; selecting, using a traffic routing software unit comprised in the at least one computing processor, a secure web container through which web content is to be accessed during the web browsing session, wherein the network comprises two or more secure web containers, and wherein a first secure web container, of the two or more secure web containers is located in a first secure web container location of the network and a second secure web container, of the two or more secure web containers, is located in a second secure web container location of the network; selecting, using the traffic routing software unit, an egress node through which the web content is to be routed during the web browsing session, wherein the network comprises two or more egress nodes, and wherein a first egress node, of the two or more egress nodes, is located in a first egress node location of the network and a second egress node, of the two or more egress nodes, is located in a second egress node location of the network; and providing, via a communication connection between at least one of the two or more secure web containers and a user device defining a second location in the network, a user of the user device with secure access to the web content, wherein the web content is rendered or accessed at the secure web container, and wherein providing the user of the user device with the secure access to the web content comprises manipulating, at the secure web container, one or more elements of a browser fingerprint presented to or accessed by a web server associated with the web content such that a characteristic of the user device comprised in the manipulated browser fingerprint and/or a third location presented to or accessed by the web server is different from an actual characteristic of the user device and/or the second location, respectively.

In some embodiments, the non-transitory computer readable medium further comprises code that, when executed by the at least one computing processor of a video content server, causes the at least one computing processor to perform the operations of: generating, using a content management software unit of the at least one computing processor, a request to receive, at the secure web container, second web content from a second web server; and transmitting, using the traffic routing software unit, the request to the secure web container, Wherein the request is transmitted to the web server from the secure web container via the network by routing the request through the egress node.

In some embodiments, the second web content is received at the secure web container from the second web server via the network in response to transmitting the request to the second web server.

In some embodiments, the non-transitory computer readable medium further comprises code that, when executed by the at least one computing processor of the video content server, causes the at least one computing processor to perform the operations of: identifying, using a translation software unit associated with the secure web container, text comprised in the second web content, wherein the text defines a first language; extracting, using the translation software unit, the text from the second web content; transmitting, using the translation software unit, the text to a translation service for translation; and receiving, using the translation software unit and at the secure web container, translated text defining a second language different than the first language, wherein providing secure access of the second web content to a user of the computing apparatus comprises accessing the translated text using the translation software unit.

In some embodiments, the non-transitory computer readable medium further comprises code that, when executed by the at least one computing processor of the video content, server, causes the at least one computing processor to perform the operations of: storing, using a storage mapping software unit associated with the secure web container, at least one of the second web content, the text, and the translated text in a cloud-based storage platform.

In some embodiments, a method is provided comprising: establishing, using computing instructions comprised in at least one memory of a computing apparatus defining a first location in a network, a web browsing session with the network; selecting, using a traffic routing software unit comprised in at least one computing processor of the computing apparatus, a secure web container through which web content is to be accessed during the web browsing session, wherein the network comprises two or more secure web containers, and wherein a first secure web container, of the two or more secure web containers, is located in a first secure web container location of the network and a second secure web container, of the two or more secure web containers, is located in a second secure web container location of the network; selecting, using the traffic routing software unit, an egress node through which the web content is to be routed during the web browsing session, wherein the network comprises two or more egress nodes, and wherein a first egress node, of the two or more egress nodes, is located in a first egress node location of the network and a second egress node, of the two or more egress nodes, is located in a second egress node location of the network; and providing, via a communication connection between at least one of the two or more secure web containers and a user device defining a second location in the network, a user of the user device with secure access to the web content, wherein the web content is rendered or accessed at the secure web container, and wherein providing the user of the user device with the secure access to the web content comprises manipulating, at the secure web container, one or more elements of a browser fingerprint presented to or accessed by a web server associated with the web content such that a characteristic of the user device comprised in the manipulated browser fingerprint and/or a third location presented to or accessed by the web server is different from an actual characteristic of the user device and/or the second location, respectively.

In some embodiments, the method further comprises: generating, using a content management software unit of the at least one computing processor, a request to receive, at the secure web container, second web content from a second web server; and transmitting, using the traffic routing software unit, the request to the secure web container, wherein the request is transmitted to the web server from the secure web container via the network by routing the request through the egress node.

In some embodiments, the method further comprises: receiving, using the traffic routing software unit, the second web content at the secure web container from the second web server via the network in response to transmitting the request to the second web server.

In some embodiments, the method further comprises: identifying, using a translation software unit associated with the secure web container, text comprised in the second web content, wherein the text defines a first language; extracting, using the translation software unit, the text from the second web content; transmitting, using the translation software unit, the text to a translation service for translation; and receiving, using the translation software unit and at the secure web container, translated text defining a second language different than the first language, wherein providing secure access of the second web content to a user of the computing apparatus comprises accessing the translated text using the translation software unit.

In some embodiments, the method further comprises storing, using a storage mapping software unit associated with the secure web container, at least one of the second web content, the text, and the translated text in a cloud-based storage platform.

In some embodiments, the manipulation of the one or more elements of the browser fingerprint is at least partially caused by routing of the web content accessed from at least one secure web container through at least one egress node.

In some embodiments, at least one of: the first secure web container location is the same as or different from the second secure web container location, or the first egress node location is the same as or different from the second egress node location.

In some embodiments, the first location is the same as or different from at least one of the second location, the third location, the first secure web container location, the second secure web container location, the first egress node location, or the second egress node location.

In some embodiments, the second location is the same as or different from at least one of the first location, the third location, the first secure web container location, the second secure web container location, the first egress nod location, or the second egress node location.

In some embodiments, the third location is the same as or different from at least one of the first location, the second location, the first secure web container location, the second secure web container location, the first egress node location, or the second egress node location.

In some embodiments, at least one of: the characteristic comprised in the manipulated browser fingerprint comprises the third location presented to or accessed by the web server, or the actual characteristic of the user device comprises the second location.

In some embodiments, the third location is comprised in the manipulated browser fingerprint.

In some embodiments, at least one of the first secure web container location, the second secure web container location, the first egress node location, the second egress node location, the first location, the second location, or the third location is the same as or different from the at least one of the first secure web container location, the second secure web container location, the first egress node location, the second egress node location, the first location, the second location, or the third location.

In some embodiments, at least one of: the secure web container comprises, is, or is comprised in at least one of the first secure web container, the second secure web container, the user device, or the egress node; or the egress node comprises, is, or is comprised in at least one of the first egress node or the second egress node.

Further Comments

While various implementations in accordance with the disclosed principles have been described above, it should be understood that they have been presented by way of example only, and are not limiting. Thus, the breadth and scope of the implementations should not be limited by any of the above-described exemplary implementations, but should be defined only in accordance with the claims and their equivalents issuing from this disclosure. Furthermore, the above advantages and features are provided in described implementations, but shall not limit the application of such issued claims to processes and structures accomplishing any of all of the above advantages.

Various terms used herein have special meanings within the present technical field. Whether a particular term should be construed as such a "term of art," depends on the context in which that term is used. "Connected to," "in communication with," "communicably linked to," "in communicable range of" or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 C.F.R. 1.77 or otherwise to provide organizational cues. These headings shall not limit or characterize the implementations set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any implementations in this disclosure. Neither is the "Summary" to be considered as a characterization of the implementations set forth in issued claims. Furthermore, any reference in this disclosure to "implementation" in the singular should not be used to argue that there is only a single point of novelty in this disclosure. Multiple implementations may be set forth according to the limitations of the multiple claims issuing from this disclosure, and such claims accordingly define the implementations, and their equivalents, that are protected thereby. In all instances, the scope of such claims shall be considered on their own merits in light of this disclosure, but should not be constrained by the headings herein.

Lastly, although similar reference numbers may be used to refer to similar elements for convenience, it can be appreciated that each of the various example implementations may be considered distinct variations.

What is claimed is:

1. A secure web container through which Internet content is accessed during an Internet session, the secure web container located in a first location, and the secure web container comprising:
   at least one memory comprising instructions; and
   at least one processing device configured for executing the instructions, wherein the instructions cause the at least one processing device to perform operations of:
      receiving a request for the Internet content from a user device located in a second location different from the first location, wherein the user device executes an Internet application associated with the Internet session, wherein the Internet content is associated with the Internet application and is derived from an Internet content source;
      communicating with the Internet content source to access the Internet content, such that the user device is substantially insulated from communicating directly with the Internet content source; and
      transmitting second Internet content to the user device, wherein the user device initiates display of, using a graphical processing unit (GPU) comprised in the at least one user device, the second Internet content to a user of the user device,
      wherein the Internet content or the second Internet content is routed through an egress node selected from one or more egress nodes.

2. The secure web container of claim 1, wherein the user device is a mobile device.

3. The secure web container of claim 1, wherein the second Internet content is a modified version of the Internet content.

4. The secure web container of claim 1, wherein the egress node is located at a third location the same as, different from, or similar to the first location or the second location.

5. The secure web container of claim 1, wherein the secure web container is isolated from a second secure web container.

6. The secure web container of claim 1, wherein the secure web container is allocated computing resources based on a volume of Internet content requests received from the user device.

7. The secure web container of claim 1, wherein the secure web container performs at least one of rendering or executing the Internet content remotely from the user device.

8. The secure web container of claim 1, wherein a third-party service, located at a third location different from at least one of the first location or the second location, analyzes a file.

9. The secure web container of claim 1, wherein a second user device executing a second Internet application accesses at least one of the same Internet content or the same second Internet content as the user device executing the Internet application.

10. The secure web container of claim 1, wherein an anonymous user identity is presented to the Internet content source.

11. A method comprising:
   receiving, using a secure web container located at a first location, a request for Internet content from a user device located in a second location different from the first location, wherein the user device executes an Internet application associated with an Internet session, and wherein the Internet content is associated with the Internet application and is derived from an Internet content source;
   communicating, using the secure web container, with the Internet content source to access the Internet content, such that the user device is substantially insulated from communicating directly with the Internet content source; and
   transmitting, using the secure web container, second Internet content to the user device, wherein the user device initiates display of, using a graphical processing unit (GPU) comprised in the at least one user device, the second Internet content to a user of the user device,
   wherein the Internet content or the second Internet content is routed through an egress node selected from one or more egress nodes, and
   wherein the secure web container comprises a computing apparatus through which the Internet content is to be accessed by the user device during the Internet session.

12. The method of claim 11, wherein the display of the second Internet content occurs within a browser application executed on the user device.

13. The method of claim 11, wherein the communication between the secure web container and the user device is encrypted.

14. The method of claim 11, wherein data associated with the Internet session is stored in one or more physical locations based on a policy.

15. The method of claim 11, wherein data associated with the Internet session is stored on a cloud-based storage platform, and wherein the user can configure access to the data stored on the cloud-based storage platform.

16. The method of claim 11, wherein data stored in a cloud-based storage platform is deleted after an established period of time based on data retention rules.

17. The method of claim 11, wherein the secure web container is selected from a plurality of secure web containers.

18. The method of claim 17, wherein the selection of a secure web container from a plurality of secure web containers is based on identification information associated with the user device.

19. The method of claim 17, wherein the selection of a secure web container from a plurality of secure web containers is based on a physical location of the user device.

20. The method of claim 11, wherein the selection of the egress node from the one or more egress nodes is based on identification information associated with the user device.

21. The method of claim 11, wherein the selection of the egress node from the one or more egress nodes is based on a physical location of the user device.

* * * * *